(12) United States Patent
Kawamata et al.

(10) Patent No.: US 10,791,287 B2
(45) Date of Patent: Sep. 29, 2020

(54) IMAGING CONTROL APPARATUS AND METHOD, AND VEHICLE

(71) Applicant: SONY CORPORATION, Tokyo (JP)

(72) Inventors: Daisuke Kawamata, Kanagawa (JP); Hiroyuki Tanaka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/303,189

(22) PCT Filed: May 29, 2017

(86) PCT No.: PCT/JP2017/019829
§ 371 (c)(1),
(2) Date: Nov. 20, 2018

(87) PCT Pub. No.: WO2017/212955
PCT Pub. Date: Dec. 14, 2017

(65) Prior Publication Data
US 2019/0306444 A1    Oct. 3, 2019

(30) Foreign Application Priority Data

Jun. 9, 2016  (JP) .................................. 2016-114976

(51) Int. Cl.
*H04N 5/355*    (2011.01)
*H04N 5/235*    (2006.01)
(Continued)

(52) U.S. Cl.
CPC ..... *H04N 5/35581* (2013.01); *G06K 9/00791* (2013.01); *G06T 5/007* (2013.01);
(Continued)

(58) Field of Classification Search
CPC .......... H04N 5/35581; H04N 5/35554; H04N 1/407; H04N 5/2355; H04N 7/183;
(Continued)

(56) References Cited

U.S. PATENT DOCUMENTS

2003/0001962 A1   1/2003   Sakurai
2010/0309346 A1*  12/2010  Brunner ................. H04N 5/202
                                                  348/254
(Continued)

FOREIGN PATENT DOCUMENTS

JP    2003-018457 A    1/2003
JP    2013-239143 A    11/2013
(Continued)

OTHER PUBLICATIONS

International Search Report and Written Opinion of PCT Application No. PCT/JP2017/019829 dated Aug. 1, 2017, 08 pages of ISRWO.

*Primary Examiner* — Albert H Cutler
(74) *Attorney, Agent, or Firm* — Chip Law Group

(57) ABSTRACT

Provided is an imaging control apparatus, method, and a vehicle, capable of efficiently analyzing an image. Among a short accumulation signal and a long accumulation signal of a photographed image, the short accumulation signal of a preceding frame is set to correspond to the short accumulation signal of a succeeding frame. The signal of the succeeding frame is processed by using the short accumulation signal of the preceding frame. The present technology is applicable to control imaging in an apparatus that supports driving of a vehicle by performing various processing, in each of frames of an N-frame sequence, for example, of recognizing various target objects necessary in supporting the driving of the vehicle, such as an obstacle, a guidance object, and other target objects, for example.

7 Claims, 21 Drawing Sheets

(51) Int. Cl.
  *G06T 5/40* (2006.01)
  *H04N 1/407* (2006.01)
  *G06T 7/70* (2017.01)
  *G06T 5/50* (2006.01)
  *G06T 5/00* (2006.01)
  *G06K 9/00* (2006.01)
  *H04N 7/18* (2006.01)

(52) U.S. Cl.
  CPC .............. *G06T 5/40* (2013.01); *G06T 5/50* (2013.01); *G06T 7/70* (2017.01); *H04N 1/407* (2013.01); *H04N 5/2355* (2013.01); *H04N 5/35554* (2013.01); *H04N 7/183* (2013.01); *G06T 2207/10016* (2013.01); *G06T 2207/10021* (2013.01); *G06T 2207/10028* (2013.01); *G06T 2207/10048* (2013.01); *G06T 2207/30256* (2013.01); *G06T 2207/30261* (2013.01)

(58) Field of Classification Search
  CPC .......... H04N 5/23232; H04N 5/23245; H04N 5/3535; H04N 5/355; H04N 5/35536; H04N 5/35545; H04N 5/35572; G06T 5/40; G06T 7/70; G06T 5/50; G06T 5/007; G06T 2207/10016; G06T 2207/30261; G06T 2207/30256; G06T 2207/10021; G06T 2207/10028; G06T 2207/10048; G06K 9/00791
  See application file for complete search history.

(56) References Cited

U.S. PATENT DOCUMENTS

| | | | |
|---|---|---|---|
| 2011/0242368 A1* | 10/2011 | Haneda | H04N 5/235 348/239 |
| 2011/0292246 A1* | 12/2011 | Brunner | G06T 5/009 348/231.99 |
| 2012/0287294 A1* | 11/2012 | Kaizu | H04N 5/2355 348/208.4 |
| 2013/0293748 A1* | 11/2013 | Fukutomi | G06T 5/007 348/254 |
| 2016/0037046 A1* | 2/2016 | Nashizawa | H04N 5/2355 348/229.1 |
| 2016/0094772 A1* | 3/2016 | Tanaka | H04N 1/00 348/239 |
| 2016/0344977 A1* | 11/2016 | Murao | H04N 5/23245 |

FOREIGN PATENT DOCUMENTS

| | | |
|---|---|---|
| JP | 2015-142201 A | 8/2015 |
| JP | 2016-053849 A | 4/2016 |
| WO | 2016/035570 A1 | 3/2016 |

* cited by examiner

IMAGING CONTROL APPARATUS AND METHOD, AND VEHICLE

CROSS REFERENCE TO RELATED APPLICATIONS

This application is a U.S. National Phase of International Patent Application No. PCT/JP2017/019829 filed on May 29, 2017, which claims priority benefit of Japanese Patent Application No. JP 2016-114976 filed in the Japan Patent Office on Jun. 9, 2016. Each of the above-referenced applications is hereby incorporated herein by reference in its entirety.

TECHNICAL FIELD

The present technology relates to an imaging control apparatus and method, and a vehicle and particularly relates to an imaging control apparatus and method, and a vehicle capable of efficiently analyzing images.

BACKGROUND ART

Various proposals have been made to enable a driver to safely drive a vehicle. For example, it has been proposed to use a radar to scan the front of the vehicle so as to control to notify the driver with a warning or automatically operate the brake when another vehicle or an obstacle is sensed. Furthermore, it has also been proposed to automatically control the traveling speed so as to set the distance to the vehicle traveling ahead to an appropriate distance.

Moreover, there is also a known technique of photographing to recognize white lines and road signs on a road, or the like, using a video camera, and to present the information to the driver of the vehicle as necessary (for example, refer to Patent Documents 1).

CITATION LIST

Patent Document

Patent Document 1: Japanese Patent Application Laid-Open No. 2013-239143

SUMMARY OF THE INVENTION

Problems to be Solved by the Invention

Meanwhile, driving support requires quick response. The longer the response time is, the longer the vehicle travel distance within that time, leading to a failure in giving a support in time. For this reason, for example, efficient image analysis would be desired in a case where a vehicle surrounding is photographed and the photographed image is analyzed to sense the presence or absence of an obstacle or the like.

The present technology has been made in view of such a situation and aims to enable efficient image analysis.

Solutions to Problems

An aspect of the present technology is an imaging control apparatus including: a controller that causes a short accumulation signal of a preceding frame to correspond to the short accumulation signal of a succeeding frame; and a processor that uses the short accumulation signal of the preceding frame to process the signal of the succeeding frame.

The apparatus can be configured such that the controller causes short accumulation exposure for generating the short accumulation signal of the preceding frame to correspond to the short accumulation exposure for generating the short accumulation signal of the succeeding frame, and the processor uses the short accumulation signal of the preceding frame to apply tone conversion on a composite signal of the short accumulation signal and a long accumulation signal of the succeeding frame.

The preceding frame and the succeeding frame can constitute an N-frame sequence.

The apparatus can further include an examination unit that applies histogram examination on the short accumulation signal of the preceding frame to generate a tone conversion curve, and the processor can perform tone conversion on the basis of the tone conversion curve.

The examination unit can apply histogram examination on a composite signal obtained by combining the short accumulation signal and the long accumulation signal of the preceding frame.

The controller can control the exposure of the succeeding frame on the basis of the short accumulation signal of the preceding frame.

The apparatus can further include a recognition unit that recognizes a recognition target from the signal that has undergone tone conversion.

An aspect of the present technology is an imaging control method including: a step of causing a short accumulation signal of a preceding frame to correspond to the short accumulation signal of a succeeding frame; and a step of using the short accumulation signal of the preceding frame to process the signal of the succeeding frame.

An aspect of the present technology is a vehicle including: a photographing unit that outputs a short accumulation signal and a long accumulation signal of a photographed image; a controller that causes the short accumulation signal of a preceding frame to correspond to the short accumulation signal of a succeeding frame; a processor that uses the short accumulation signal of the preceding frame to process the signal of the succeeding frame; and a recognition unit that recognizes a recognition target from the processed signal.

According to an aspect of the present technology, the short accumulation signal of the preceding frame is set to correspond to the short accumulation signal of the succeeding frame, and the short accumulation signal of the preceding frame is used to process the signal of the succeeding frame.

Effects of the Invention

As described above, according to an aspect of the present technology, it is possible to efficiently analyze an image. Note that effects described here in the present specification are provided for purposes of exemplary illustration and are not intended to be limiting. Still other additional effects may also be contemplated.

MODE FOR CARRYING OUT THE INVENTION

Hereinafter, embodiments of the present technology (hereinafter, embodiment(s)) will be described. Note that description will be presented in the following order.

Figure 1:
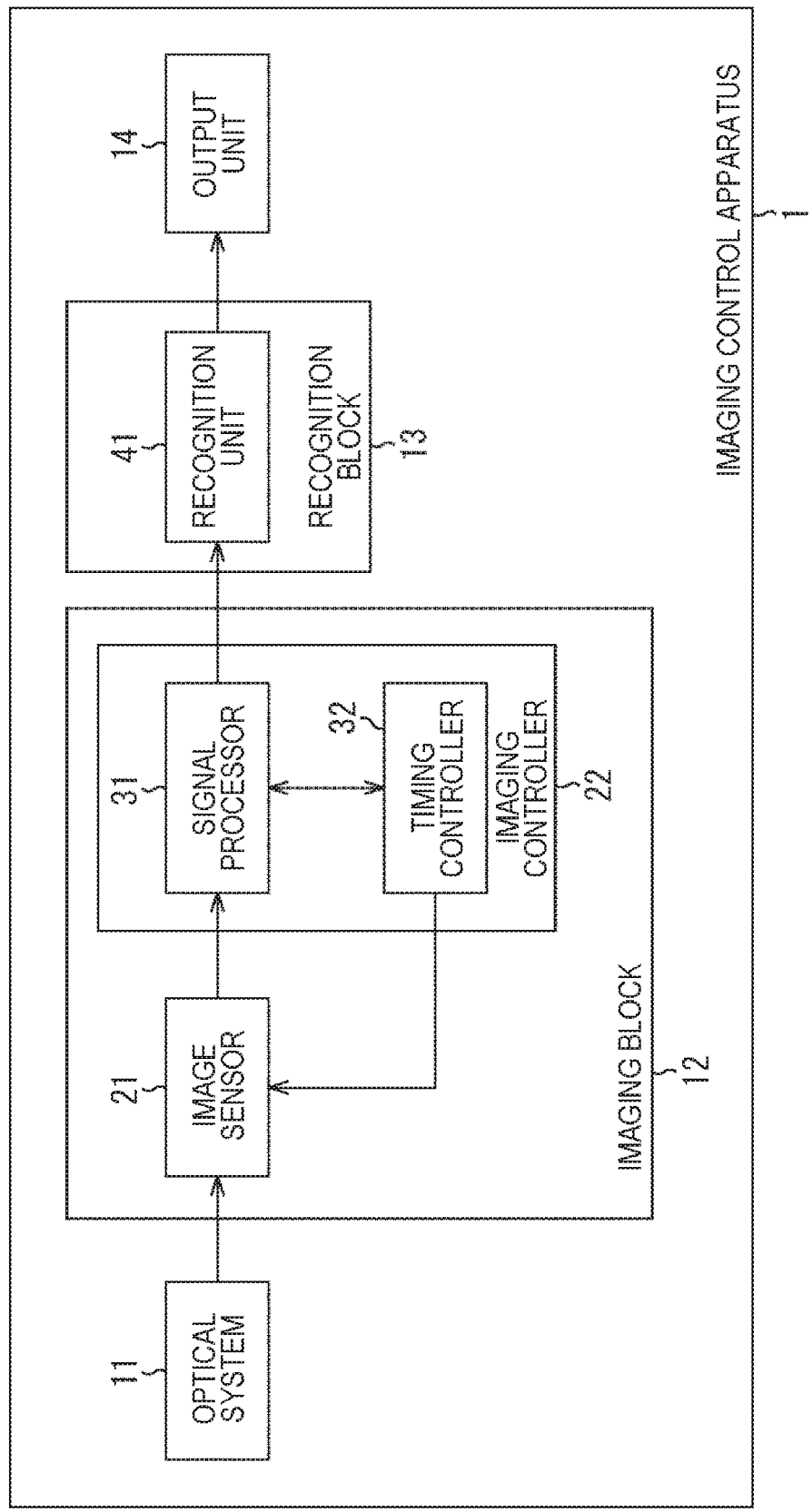
FIG. 1 is a block diagram illustrating a configuration of an imaging control apparatus according to an embodiment of the present technology.

1. Embodiments
(1) Configuration example of imaging control apparatus (FIG. 1)
(2) Frame sequence (FIG. 2)
(3) Exposure control processing (FIG. 3)
(4) Tone conversion processing (FIGS. 4, 5, 6A, 6B, 6C, 7A, 7B, and 8)
(5) Frame sequence for comparison (FIGS. 9 to 11)
(6) Exposure timing of the image sensor (FIGS. 12 to 15)
(7) Reflecting exposure control (FIGS. 16 to 19)
2. Application example (FIGS. 20 and 21)
3. Others 1. Embodiments (1) Configuration Example of Imaging Control Apparatus FIG. 1 is a block diagram illustrating a configuration of an imaging control apparatus according to an embodiment of the present technology. The imaging control apparatus 1 includes an optical system 11, an imaging block 12, a recognition block 13, and an output unit 14. Note that while FIG. 1 illustrates a state in which these units are integrated, a part of these can be provided as a separate component.

The imaging block 12 includes an image sensor 21 and an imaging controller 22. The imaging controller 22 includes a signal processor 31 and a timing controller 32. The recognition block 13 includes a recognition unit 41. Note that the image sensor 21 can be disposed outside the imaging block 12 as necessary.

The optical system 11 includes a zoom lens, a focus lens, a diaphragm, or the like, and collects light from a subject, that is, a recognition target, and allows the light to be incident on the image sensor 21 to form an image. Examples of the sensor 21 include image sensors such as a complementary metal oxide semiconductor (CMOS) image sensor and a charge coupled device (CCD) image sensor. The image sensor 21 receives incident light from the optical system 11 and performs photoelectric conversion so as to capture an image of the subject (recognition target) corresponding to incident light from the optical system 11. In other words, the image sensor 21 performs photographing at a photographing timing designated by the timing controller 32, and outputs a corresponding photographing signal.

In addition, the image sensor 21 has a function of controlling the exposure time of internal pixels to output a long accumulation signal generated by executing long accumulation exposure using a long exposure time and output a short accumulation signal generated by executing short accumulation exposure using a short exposure time. In other words, the image sensor 21 can electronically change the exposure setting on pixel-by-pixel basis. The signal processor 31 further executes wide dynamic range (WDR) processing and tone conversion processing.

The signal processor 31 applies processing such as noise reduction or white balance (WB) adjustment, on the output image, for example. Furthermore, the signal processor 31 examines the brightness of the photographed image, and outputs an exposure time at which the brightness of the photographed image becomes appropriate as an appropriate exposure time to the timing controller 32.

The timing controller 32 controls the photographing timing of the image sensor 21. In the present embodiment, the timing controller 32 controls the image sensor 21 so that photographing is performed in an N-frame sequence. While details will be described later with reference to FIG. 2, photographing is performed with N frames as one frame sequence. Although the value of N may be any value, the following description will be given using an example in which N=4.

The recognition unit 41 analyzes the image of each of frames constituting the frame sequence, and performs recognition processing on the processing target. In the present case where 4-frame sequence is used, recognition processing for the first target object is executed in a first frame, and recognition processing for the second to fourth target objects are respectively executed in the second to fourth frames in a similar manner. This recognition processing is processing of recognizing a target object necessary for supporting the driving of the vehicle. For example, it is possible to recognize obstacles, guidance objects, and other target objects present at travel of the vehicle by the number of frames constituting the frame sequence (accordingly, four types of target objects in the present case).

The output unit 14 includes, for example, a monitor, a speaker, or the like, and presents necessary information based on the recognition result to a user (driver).

The imaging control apparatus 1 is mounted on a vehicle such as an automobile, for example.

(2) Frame Sequence

Figure 2:
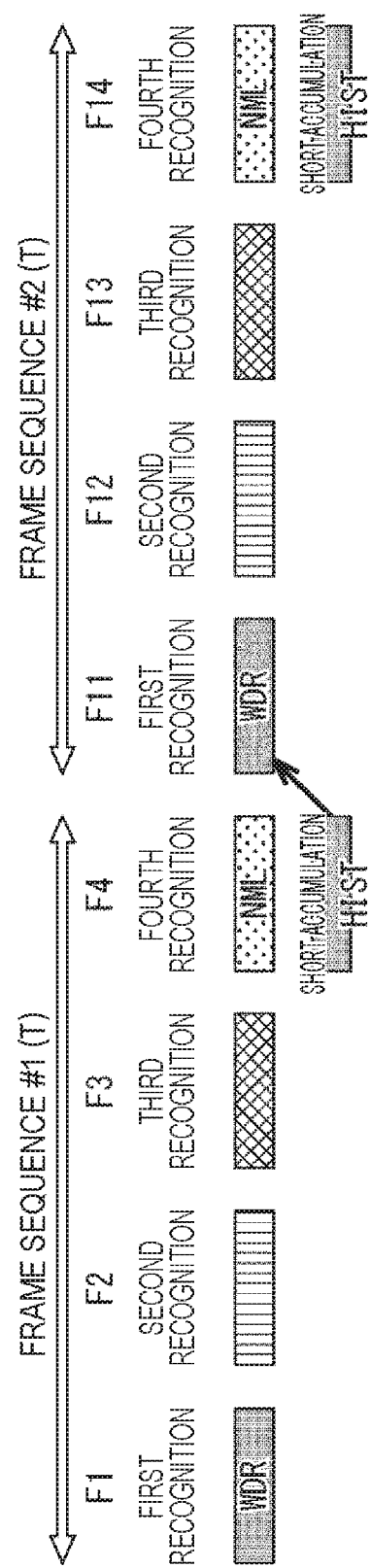
FIG. 2 is a diagram illustrating recognition processing according to an embodiment of the present technology.

FIG. 2 is a diagram illustrating recognition processing according to an embodiment of the present technology. This figure schematically illustrates recognition processing in each of frames of each of frame sequences.

As illustrated in FIG. 2, in the present embodiment, images are periodically obtained with N-frame sequence (N=4 in the case of FIG. 2), and images of each of the frames are analyzed to execute predetermined recognition processing. In the case of the embodiment of FIG. 2, the temporal length of one frame sequence is T seconds (a certain time of one second or less, for example), and this frame sequence is repeated every T seconds. FIG. 2 illustrates frame sequence #1 and frame sequence #2.

In frame sequence #1, a first frame F1 is the first recognition frame, the second frame F2 is the second recognition frame, a third frame F3 is the third recognition frame, and a fourth frame F4 is the fourth recognition frame.

Similarly, in frame sequence #2, a first frame F11 is the first recognition frame, a second frame F12 is the second recognition frame, a third frame F13 is the third recognition frame, and a fourth frame F14 is the fourth recognition frame.

Note that in FIG. 2, a symbol of WDR is added to the first frame as a title representing its feature. WDR stands for Wide Dynamic Range, in which double exposures, namely, long and short accumulation exposures are performed in this frame. In the fourth frame, symbols NML and HIST are added as titles representing its features. NML represents Normal, and normal exposure, that is, single exposure of long accumulation exposure alone is performed in this frame. In addition, HIST represents Histogram, and HIST processing is performed in this frame.

A video signal output from the image sensor 21 undergoes noise reduction processing, WB processing, or the like, in the signal processor 31, and then input to the recognition unit 41. The recognition unit 41 executes first recognition processing on the basis of the video signal of the first frame of each of the frame sequences.

In the first recognition processing, the signal processor 31 executes processing of broaden the dynamic range to the wide dynamic range (WDR). That is, in a normal dynamic range, it is difficult to accurately recognize a target of each of parts from video with extremely high contrast, a backlit video, or the like. To cope with this, the dynamic range is broadened to enable accurate recognition of the target of each of parts even from the video with extremely high contrast, a backlit video, or the like.

Furthermore, the signal processor 31 executes adaptive tone reproduction (ATR) processing in this first frame. In order to implement the processing in the first frame, processing for causing the short accumulation exposure of the fourth frame of an immediately preceding frame sequence to correspond to the short accumulation exposure of the first frame is executed. Subsequently, a histogram is generated from a short accumulation signal in the fourth frame, and a tone conversion curve is generated on the basis of the generated histogram. In the first frame, tone conversion processing is executed on the basis of the tone conversion curve.

The short accumulation exposure on the fourth frame is set to correspond to the short accumulation exposure on the first frame (in order to make it available for first processing of the first frame), making it difficult to assign recognition processing needing short accumulation exposure independently to the fourth recognition processing of the fourth frame. That is, recognition processing that does not need short accumulation exposure is assigned to the fourth recognition processing of the fourth frame. Accordingly, the fourth frame is a normal exposure frame in which single exposure with long accumulation exposure alone is performed (with no use of short accumulation exposure).

The recognition unit 41 executes second recognition processing in the second frame next to the first frame on the basis of its video signal, and executes third recognition processing in the third frame on the basis of its video signal. Next, the recognition unit 41 executes the fourth recognition processing in the fourth frame on the basis of its video signal. The recognition result is supplied to the output unit 14 as necessary and presented to the user.

In the embodiment of FIG. 2, the number of frames constituting the frame sequence is four. However, the number can be increased or decreased depending on the number of recognition targets.

(3) Exposure Control Processing

Figure 3:
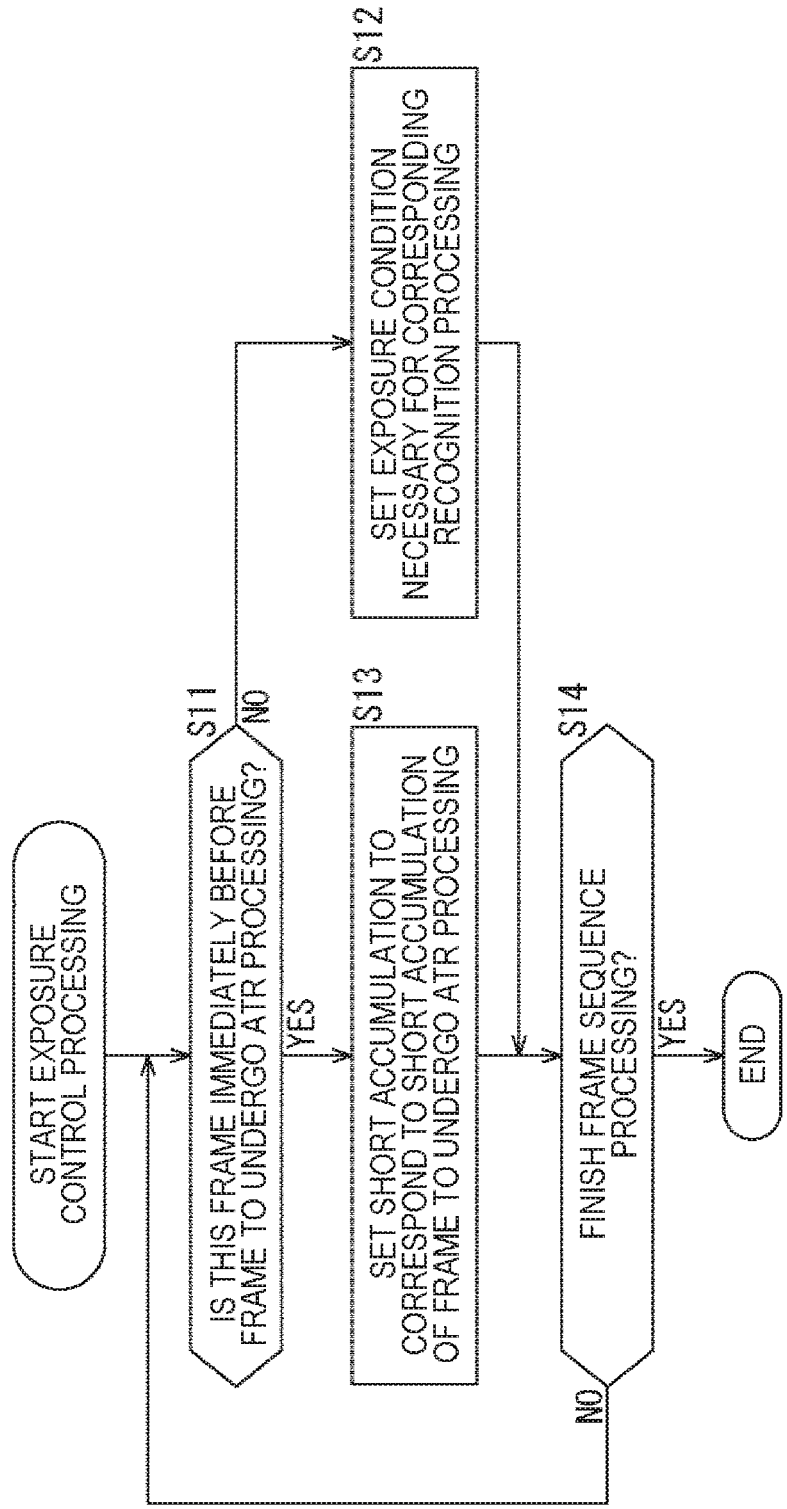
FIG. 3 is a flowchart illustrating an exposure control processing according to an embodiment of the present technology.

Next, exposure control processing will be described with reference to FIG. 3. FIG. 3 is a flowchart illustrating exposure control processing according to an embodiment of the present technology.

In step S11, the signal processor 31 determines whether or not the current frame of the video signal input from the image sensor 21 is the frame immediately before the frame that is to undergo ATR processing. As described with reference to FIG. 2, the frame that is to undergo ATR processing is the first frame (frame F1, F11), and the frame immediately before this frame is the fourth frame (frame F4, F14). In other words, whether or not the current frame is the fourth frame is determined. Furthermore, as described above, this fourth frame needs to be a normal exposure frame.

In a case where it is determined that the current frame is not the fourth frame, the current frame is the first, second, or third frame. In this case, the signal processor 31 sets in step S12 exposure conditions necessary for corresponding recognition processing. For example, the signal processor 31 causes the timing controller 32 to set the exposure time necessary for the corresponding recognition processing. That is, in a case where the current frame is the first frame, the exposure time of the long accumulation exposure and the short accumulation exposure is set to the exposure time needed for the first recognition processing. While the exposure conditions may naturally include adjustment of the gain, the diaphragm, the lens, or the like in addition to the exposure time, the following description will be given assuming the exposure time as the exposure condition.

Similarly, in a case where the current frame is the second frame, the exposure time of the long accumulation exposure and the short accumulation exposure is set to the exposure time needed for the second recognition processing. In a case where the current frame is the third frame, the exposure time of the long accumulation exposure and the short accumulation exposure is set to the exposure time needed for the third recognition processing. Note that the control of the exposure time can be omitted in a case where the short accumulation signal is not used.

Meanwhile, in a case where it is determined in step S11 that the current frame is a frame immediately before the frame that is to undergo ATR processing, that is, it is the fourth frame, the processing proceeds to step S13. In step S13, the signal processor 31 executes processing of causing short accumulation of the current frame to correspond to short accumulation of frames to undergo ATR processing. That is, processing of causing the short accumulation exposure time of the fourth frame to correspond to the short accumulation exposure time of the frame to undergo ATR processing is executed. Specifically, the signal processor 31 causes the timing controller 32 to set the short accumulation exposure time of the fourth frame to correspond to the short accumulation exposure time of the first frame. With this setting, the short accumulation exposure time of the fourth frame agrees with the short accumulation exposure time of the first frame. The long accumulation exposure time of the fourth frame is set to the time necessary for the fourth recognition processing.

The short accumulation signal is not used in the fourth recognition processing. Accordingly, the fourth recognition processing is executable even when the short accumulation exposure of the fourth frame is set to correspond to the short accumulation exposure of the first frame. In other words, in the present embodiment, recognition processing not using the short accumulation signal is arranged in the frame immediately before ATR processing.

After the processing in steps S12 and S13, the signal processor 31 determines in step S14 whether or not to finish the frame sequence processing. In a case where an instruction on the finish of the frame sequence processing is not given yet, the processing returns to step S11 and the processing of step S11 and subsequent steps is repeated. In a case where it is determined that the frame sequence processing is to be finished, the exposure control processing is finished.

(4) Tone Conversion Processing

Figure 4:
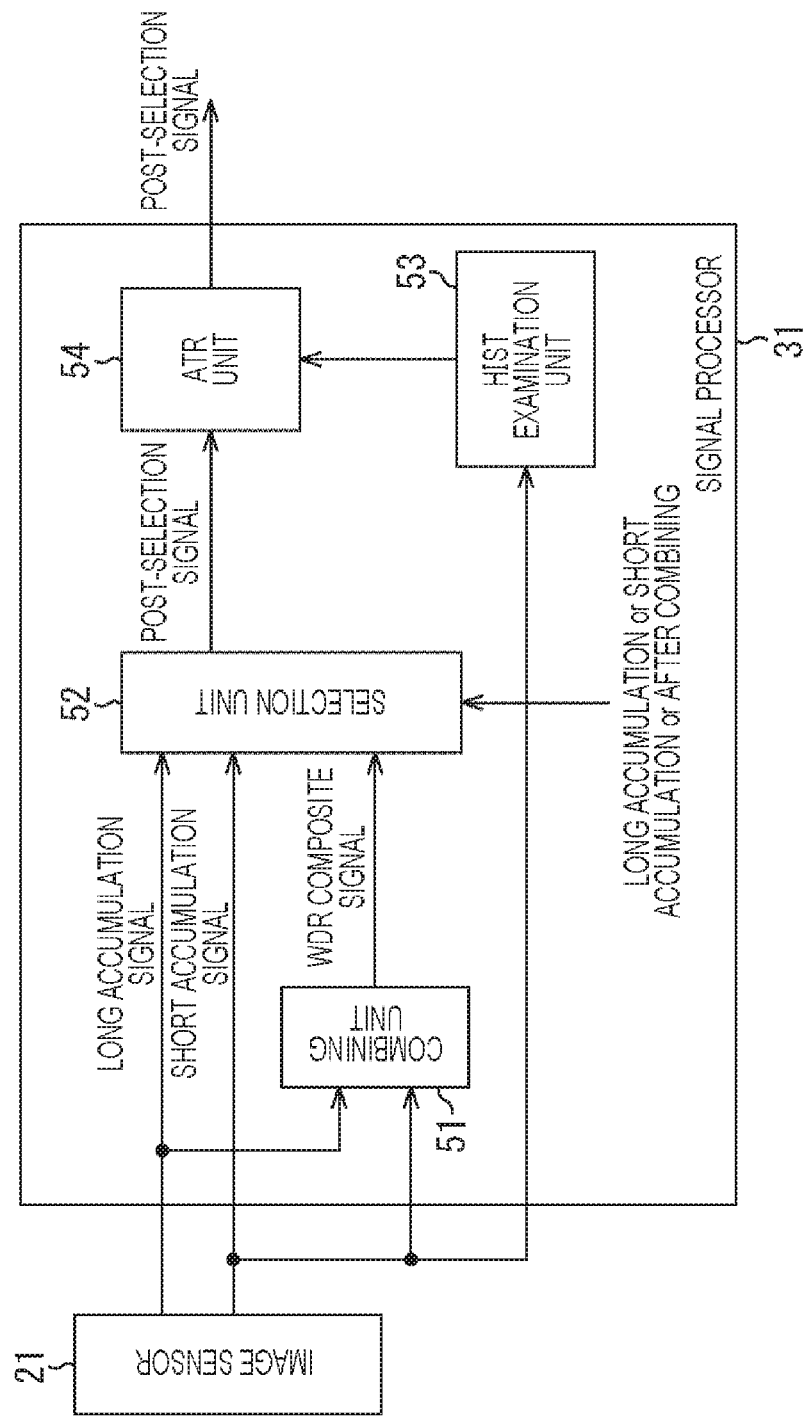
FIG. 4 is a block diagram illustrating a configuration of a signal processor according to an embodiment of the present technology.

As described above, the signal processor 31 executes WDR processing and tone conversion processing. Therefore, the signal processor 31 has a configuration illustrated in FIG. 4. FIG. 4 is a block diagram illustrating a configuration of a signal processor according to an embodiment of the present technology.

In the embodiment of FIG. 4, the signal processor 31 includes a combining unit 51, a selection unit 52, a HIST examination unit 53, and an ATR unit 54. The combining unit 51 combines the long accumulation signal and the short accumulation signal output from the image sensor 21 and output a WDR composite signal. The selection unit 52 performs switching for each of frames so as to select either the long accumulation signal and the short accumulation signal output from the image sensor 21 or the composite signal output from the combining unit 51. The selected signal (post-selection signal) is output to the ATR unit 54.

The HIST examination unit 53 performs HIST examination of the short accumulation signal output from the image sensor 21, generates a tone conversion curve, and outputs the curve to the ATR unit 54. On the basis of the tone conversion curve generated by the HIST examination unit 53, the ATR unit 54 performs tone conversion on the WDR composite signal supplied from the selection unit 52, and outputs the signal to the recognition unit 41.

Figure 5:
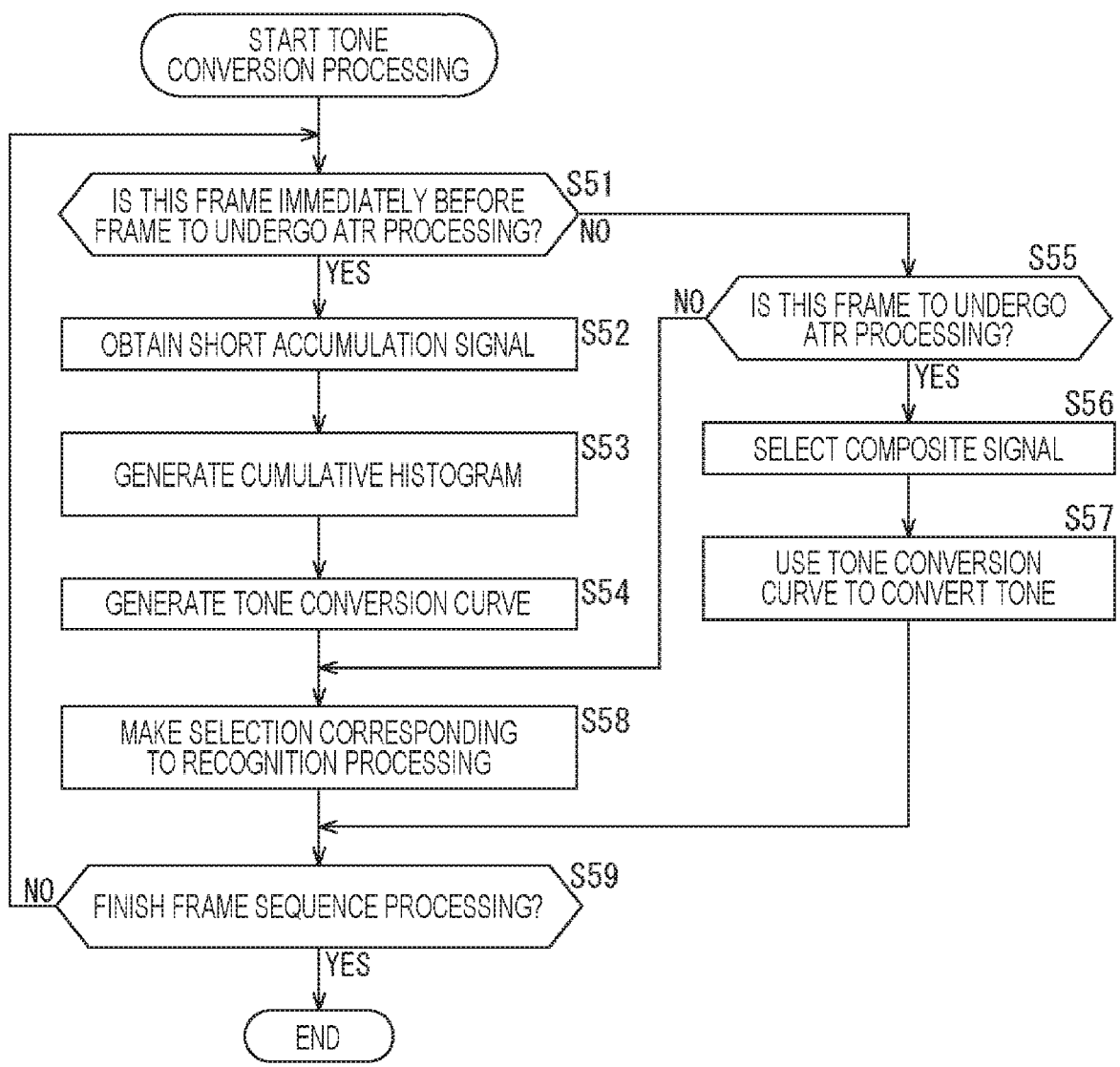
FIG. 5 is a flowchart illustrating tone conversion processing according to an embodiment of the present technology.

Next, referring to the flowchart of FIG. 5, the tone conversion processing executed by the signal processor 31 in FIG. 4 will be described. FIG. 5 is a flowchart illustrating tone conversion processing according to an embodiment of the present technology.

The HIST examination unit 53 determines in step S51 whether or not the current frame is a frame immediately before the frame to undergo ATR processing. As illustrated in FIG. 2, since the frame immediately preceding the first frame (frame F1, F11) to undergo ATR processing is the fourth frame (frame F4, F14), determination is made whether or not the current frame is the fourth frame. In other words, it is determined whether or not the current frame is the frame (frame F4, F14) having a short accumulation signal of short accumulation exposure, to which the same exposure condition as the short accumulation exposure of the frame to undergo ATR processing has been set. That is, the short accumulation exposure time of the fourth frame is set to agree with the short accumulation exposure time of the first frame by the processing of step S13 in FIG. 3.

In a case where it is determined in step S51 that the current frame is the frame immediately before the frame to undergo ATR processing, that is, in a case where it is determined that the current frame is the fourth frame (frame F4, F14), the processing of step S52 is executed. In step S52, the HIST examination unit 53 obtains a short accumulation signal. Thereafter, the HIST examination unit 53 generates a histogram.

In step S53, the HIST examination unit 53 generates a cumulative histogram. In step S54, the HIST examination unit 53 generates a tone conversion curve on the basis of the cumulative histogram. This tone conversion curve is used in processing of the next first frame (processing of step S57 to be described later).

After the processing of step S54, the selection unit 52 makes in step S58 a selection corresponding to the recognition processing. In the present case, since the current frame is the fourth frame (frame F4, F14), the long accumulation signal or the short accumulation signal is selected and supplied to the recognition unit 41 through the ATR unit 54. Subsequently, the recognition unit 41 executes the fourth recognition processing.

After the processing in step S58, the selection unit 52 determines in step S59 whether to end the frame sequence processing. In a case where an instruction on the end of the frame sequence processing is not given yet, the processing returns to step S51 and the processing of step S51 and subsequent is repeated.

Figure 6A:
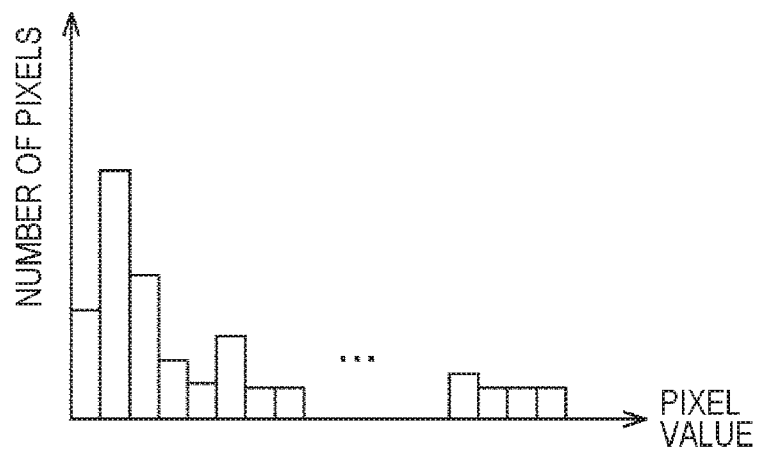
FIGS. 6A, 6B, and 6C are diagrams illustrating a tone conversion curve generation processing according to an embodiment of the present technology.
Figure 6B:
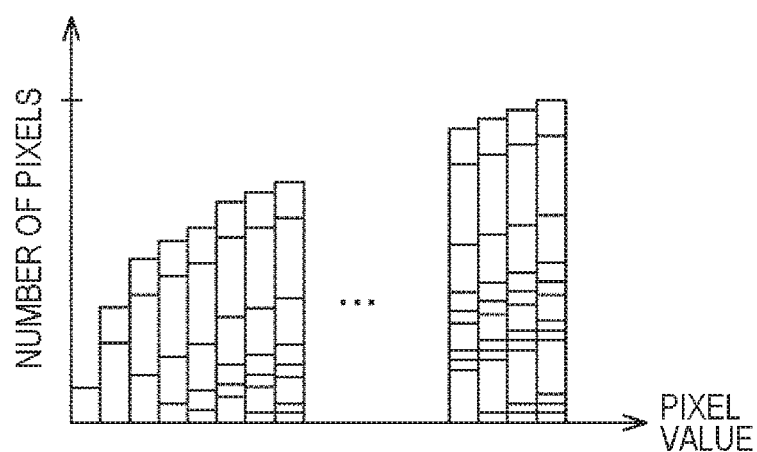
Figure 6C:
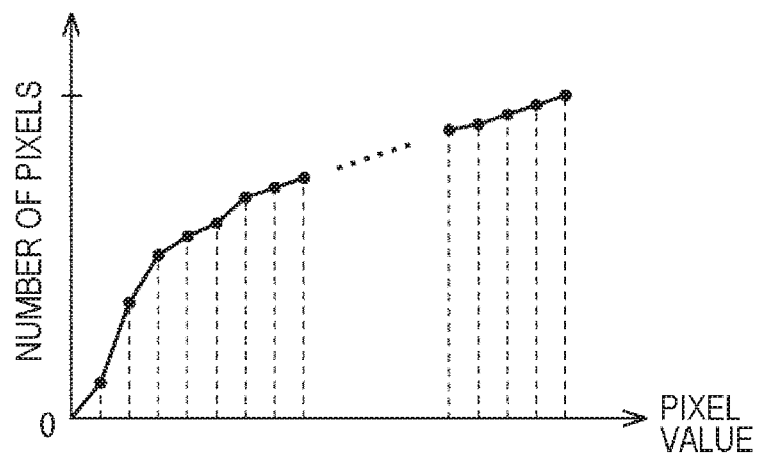

Here, processing from step S52 to step S54 will be described with reference to FIGS. 6A, 6B, 6C, 7A, and 7B. FIGS. 6A, 6B, and 6C are diagrams illustrating a tone conversion curve generation processing according to an embodiment of the present technology. FIG. 6A represents a histogram generated from the short accumulation signal obtained in step S52. In FIG. 6A, the horizontal axis represents pixel values and the vertical axis represents the number of pixels.

FIG. 6B represents the cumulative histogram generated in step S53. The processing of accumulating the number of pixels illustrated in FIG. 6A sequentially to the number of pixels of the adjacent pixel value is repeated to generate the cumulative histogram of FIG. 6B. A curve further generated on the basis of the cumulative histogram in step S54 is the curve which is the basis of the tone conversion curve illustrated in FIG. 6C. This curve is converted to be expressed with an 8-bit pixel value so as to generate a tone conversion curve illustrated in FIG. 8 to be described later.

Figure 7A:
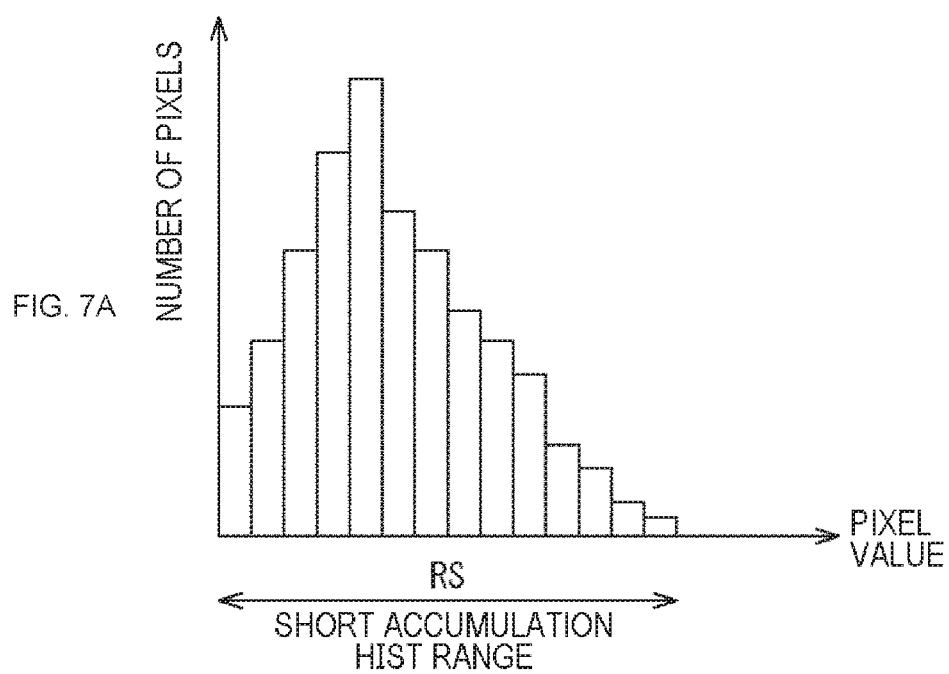
FIGS. 7A and 7B are diagrams illustrating a histogram range according to an embodiment of the present technology.
Figure 7B:
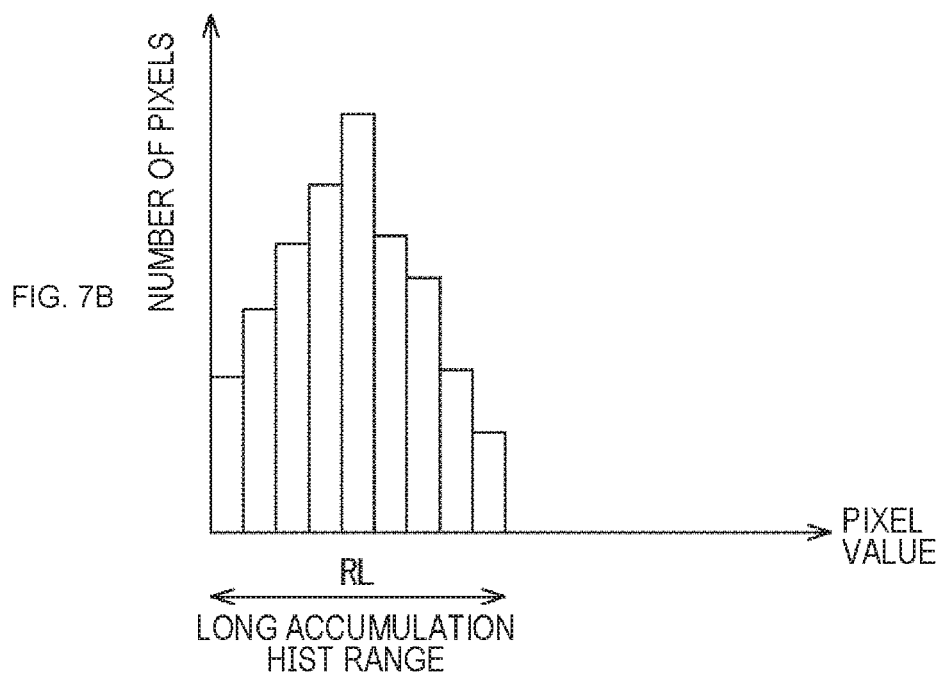

FIGS. 7A and 7B are diagrams illustrating a histogram range of an embodiment of the present technology. FIG. 7A represents a histogram generated on the basis of the short accumulation signal, and FIG. 7B represents a histogram generated on the basis of the long accumulation signal. In FIG. 7A and FIG. 7B, the horizontal axis represents the pixel value and the vertical axis represents the number of pixels. As clearly observed from the comparison between the two figures, the horizontal axis of FIG. 7A is represented by the short accumulation pixel value×exposure ratio gain, and thus, a range RS of the pixel values of the short accumulation signal is wider than a range RL of the pixel values of the long accumulation signal. Accordingly, it is possible to generate an effective tone conversion curve on the basis of the short accumulation signal.

Returning to the description of the flowchart of FIG. 5, in a case where it is determined in step S51 that the current frame is not the frame (that is, the fourth frame) immediately before the frame to undergo ATR processing, the processing of step S55 is executed. That is, in a case where the current frame is the first, second, or third frame, the selection unit 52 determines in step S55 whether or not the current frame is a frame to undergo the ATR processing. In other words, it is determined whether or not the current frame is the first frame (frame F1, F11).

In a case where it is determined that the current frame is a frame to undergo the ATR processing, the processing proceeds to step S56. That is, in a case where the current frame is the first frame (frame F1, F11), the selection unit 52 selects the composite signal in step S56. That is, the WDR composite signal combined from the long accumulation signal and the short accumulation signal by the combining unit 51 is supplied to the ATR unit 54.

In step S57, the ATR unit 53 converts the tone by using the tone conversion curve. Specifically, a tone conversion curve has been generated in the processing of step S54 of the immediately preceding frame (frame F4, F14). The ATR unit 54 uses this tone conversion curve to execute processing of converting the tone of the WDR composite signal selected by the selection unit 52.

Figure 8:
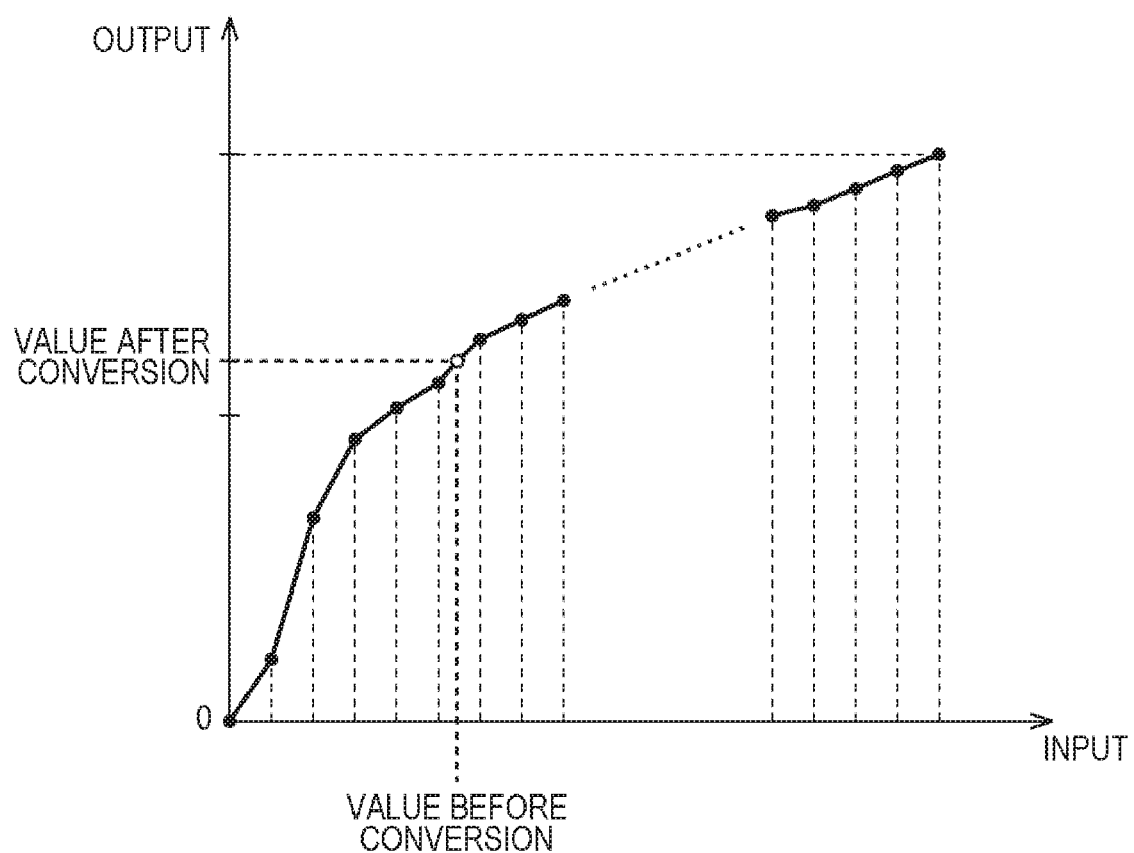
FIG. 8 is a diagram illustrating a tone conversion curve according to an embodiment of the present technology.

FIG. 8 is a diagram illustrating a tone conversion curve according to an embodiment of the present technology. In FIG. 8, the horizontal axis represents the pixel value before conversion and the vertical axis represents the converted pixel value. As illustrated in FIG. 8, the tone conversion curve is a line graph obtained by sequentially connecting two adjoining control points represented by black circles in the figure, with a straight line. The pixel value (the value on the horizontal axis) of the signal selected by the selection unit 52 before conversion is converted into a converted value (value on the vertical axis) corresponding to a point crossing the tone conversion curve.

The signal that has undergone tone conversion is supplied to the recognition unit 41, and a corresponding recognition processing is executed. In the present case, since it is the first frame (frame F1, F11), the first recognition processing is executed.

After the processing of step S57, the selection unit 52 determines in step S59 whether to finish the frame sequence processing. In a case where an instruction on the end of the frame sequence processing is not given yet, the processing returns to step S51 and the processing of step S51 and subsequent is repeated.

In a case where it is determined in step S55 that the current frame is not the first frame to undergo ATR processing, that is, the frame is either the second frame (frame F2, F12) or the third frame (frame F3, F13), the processing of step S58 is executed. In step S58, the selection unit 52 makes a selection corresponding to the recognition processing. For example, in a case where the current frame is the second frame (frame F2, F12), the signal needed for the second recognition processing among the long accumulation signal or the short accumulation signal is selected. In a case where the current frame is the third frame (frame F3, F13), the signal necessary for the third recognition processing is selected from the long accumulation signal or the short accumulation signal.

In this case, the ATR unit 54 does not perform any particular processing and supplies the selected signal to the recognition unit 41. The recognition unit 41 executes corresponding recognition processing. That is, in a case where the current frame is the second frame (frame F2, F12), the second recognition processing is executed. In a case where the current frame is the third frame (frame F3, F13), the third recognition processing is executed.

After the processing in step S58, the selection unit 52 determines in step S59 whether to end the frame sequence processing. In a case where an instruction on the end of the frame sequence processing is not given yet, the processing returns to step S51 and the processing of step S51 and subsequent is repeated.

In a case where it is determined in step S59 that the instruction on the end of the frame sequence processing is given, the processing is finished.

As described above, in this embodiment, the short accumulation exposure for generating the short accumulation signal of the preceding frame temporally earlier in the N-frame sequence is set to correspond to the short accumulation exposure for generating the short accumulation signal of the succeeding frame temporally later than the preceding frame. As a result, it is possible to efficiently utilize N frames (N=4 in the embodiment of FIG. 2) for recognition processing without waste. Furthermore, the frame to be set to correspond to the short accumulation exposure is set as the immediately preceding frame, making it possible to perform prompt recognition processing.

(5) Frame Sequence for Comparison

Figure 9:
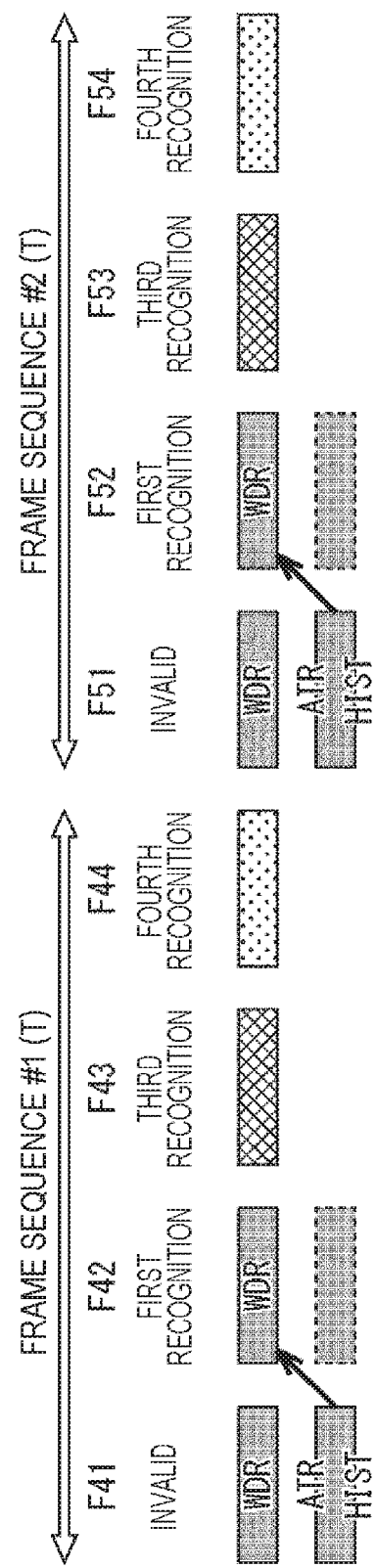
FIG. 9 is a diagram illustrating recognition processing to be compared with the present technology.

Here, another frame sequence processing example will be described with reference to FIGS. 9 to 11. FIG. 9 is a diagram illustrating recognition processing to be compared with the present technology. In the example of FIG. 9, the frame sequence #1 is constituted with four frames F41 to F44. Among them, the first recognition processing based on the WDR processing and the ATR processing is executed in the second frame F42, the third recognition processing is executed in the third frame F43, and the fourth recognition processing is executed in the fourth frame F44. Similarly, the frame sequence #2 is constituted with four frames F51 to F54. Among them, the first recognition processing based on the WDR processing and the ATR processing is executed in the second frame F52, the third recognition processing is executed in the third frame F53, and the fourth recognition processing is executed in the fourth frame F54.

In addition, for executing the ATR processing, there is a need to set the exposure conditions of the first frames F41 and F51 immediately before the second frames F42 and F52 to the same exposure conditions as those of the second frames F42 and F52. In order to enable execution of independent processing in the first frames F41 and F51, there is a need to independently set the exposure conditions of the first frames F41 and F51.

In the example of FIG. 9, however, the exposure conditions of the first frames F41 and F51 cannot be set independently. As a result, the first frames F41 and F51 are substantially invalid frames (in which independent processing cannot be executed). The result is: In the frame sequence processing of FIG. 2, four types of recognition processing, namely, the first recognition processing, the second recognition processing, the third recognition processing, and the fourth recognition processing can be executed. As opposed to this, in the processing of the frame sequence of FIG. 9, three types of recognition processing among the above can be executed. That is, the second recognition processing cannot be executed.

Figure 10:
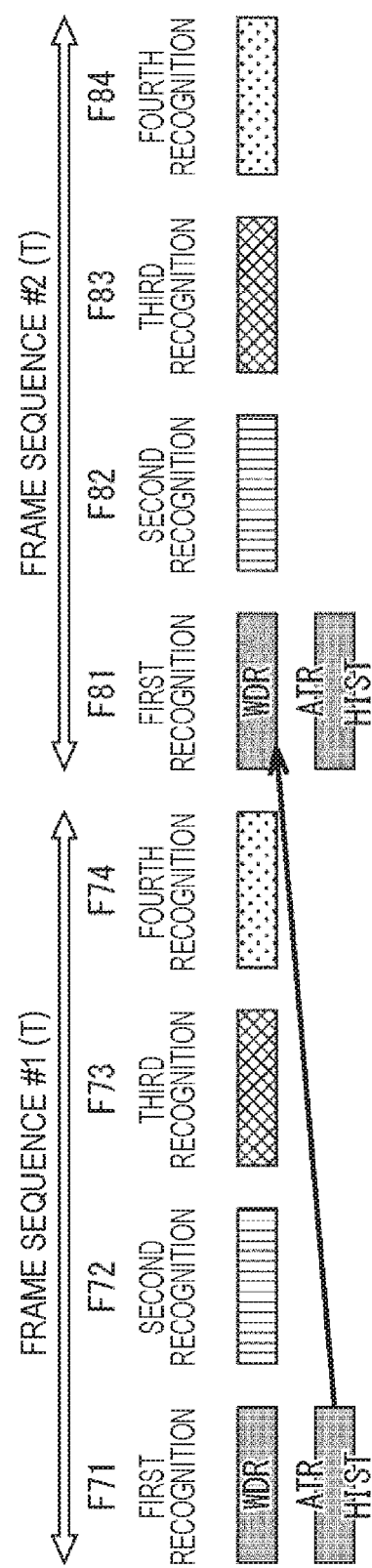
FIG. 10 is a diagram illustrating recognition processing to be compared with the present technology.

Moreover, frame sequence processing as illustrated in FIG. 10 is also conceivable. FIG. 10 is a diagram illustrating recognition processing to be compared with the present technology. In this example, four types of recognition processing are executed in both frame sequence #1 and frame sequence #2. That is, four types of processing, namely, first recognition processing of ATR, second recognition processing, third recognition processing, and fourth recognition processing are executed respectively in the first frame F71 to the fourth frame F74 of the frame sequence #1. Similarly, four types of processing, namely, first recognition processing of ATR, second recognition processing, third recognition processing, and fourth recognition processing are executed respectively in the first frame F81 to the fourth frame F84 of the frame sequence #2.

The same exposure condition is set to the same recognition processing. Accordingly, the exposure condition of the first frame F71 of the frame sequence #1 is the same as the exposure condition of the first frame F81 of the frame sequence #2. Therefore, it is possible to execute ATR processing in the first frame F81 of the frame sequence #2, by using the information of the first frame F71 of the frame sequence #1. In this processing, however, the ATR processing is executed using information of one frame sequence before (that is, T seconds before). This would hinder rapid processing, making it difficult to apply this system to a vehicle traveling at high speed. That is, as illustrated in FIG. 2, using the immediately preceding frame (that is, the frame of ¼ seconds before) would make it possible to perform quick processing.

Figure 11:
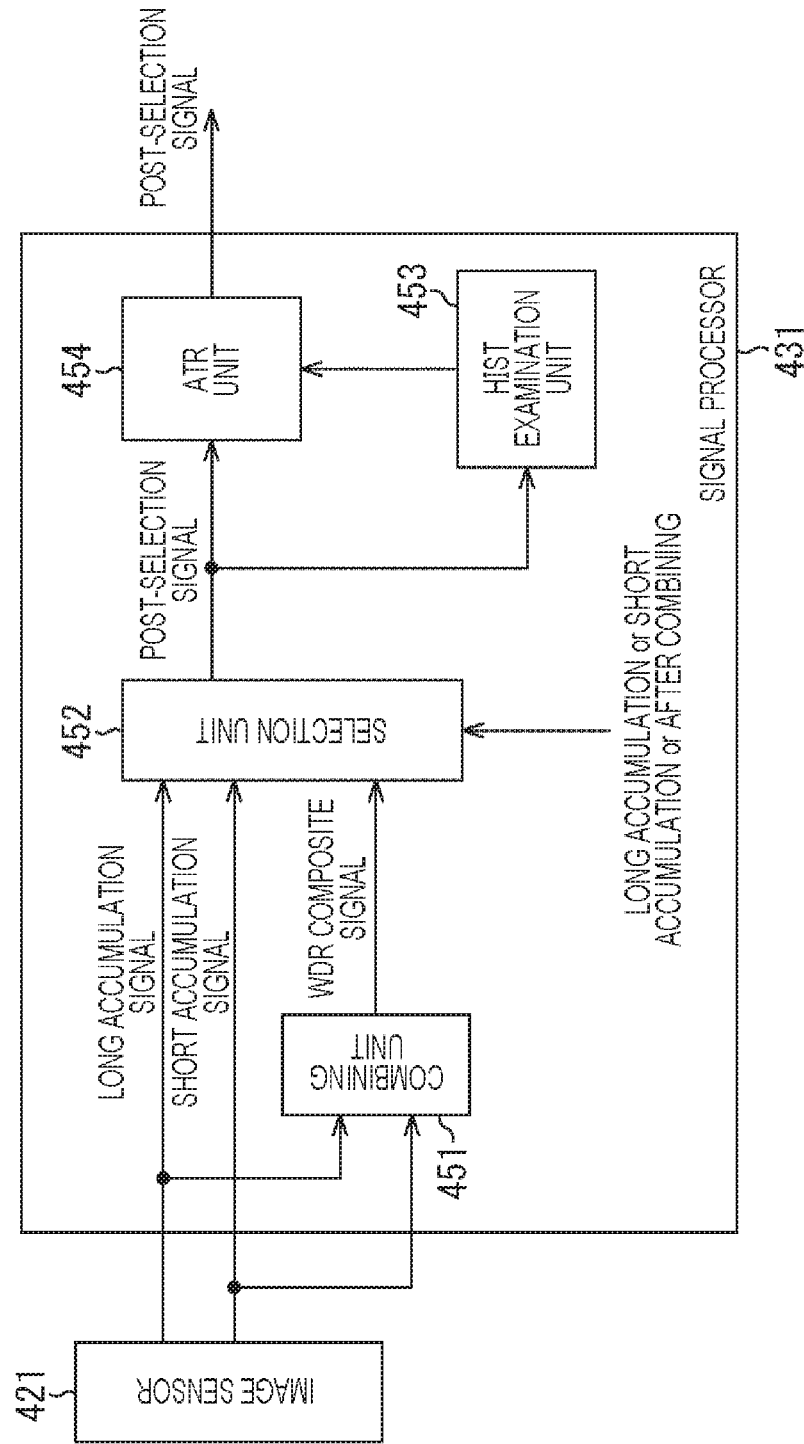
FIG. 11 is a block diagram illustrating a configuration of a signal processor to be compared with the present technology.

Similarly to the signal processor 31 illustrated in FIG. 4, the signal processor 431 that executes processing in the examples of FIGS. 9 and 10 has a configuration as illustrated in FIG. 11. FIG. 11 is a block diagram illustrating a configuration of a signal processor to be compared with the present technology. An image sensor 421, a signal processor 431, a combining unit 451, a selection unit 452, a HIST examination unit 453, and an ATR unit 454 in FIG. 11 correspond to the image sensor 21, the signal processor 31, the combining unit 51, the selection unit 52, the HIST examination unit 53, and the ATR unit 54 in FIG. 4 respectively, with similar functions.

In the signal processor 31 of FIG. 4, the HIST examination unit 53 performs HIST examination of the short accumulation signal. In contrast, in the signal processor 431 of FIG. 11, the HIST examination unit 453 performs HIST examination of post-selection signals (that is, the long accumulation signal, the short accumulation signal or the WDR composite signal) selected for each of frames by the selection unit 452.

(6) Exposure Timing of the Image Sensor

In the above, frame sequence processing has been described on the basis of a schematic timing chart. Next, a timing chart in the case of using an image sensor capable of sequentially reading pixels on a row (line) basis as the image sensor 21 will be described.

Figure 12:
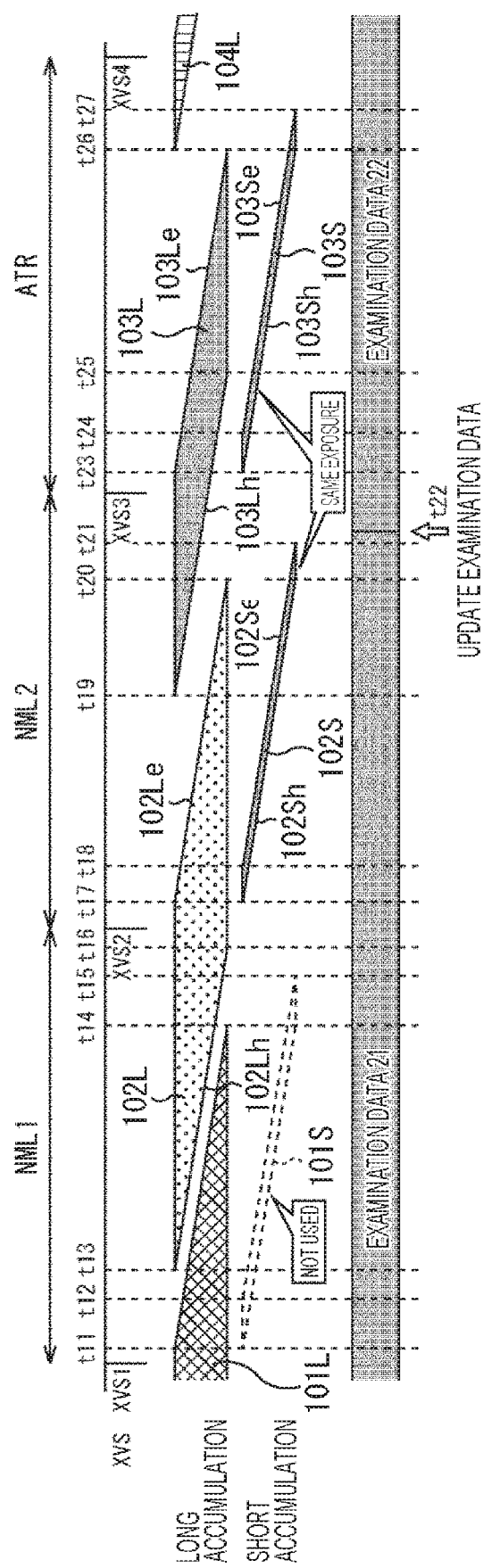
FIG. 12 is a timing chart illustrating timings of exposure control according to an embodiment of the present technology.

FIG. 12 is a timing chart illustrating timings of exposure control according to an embodiment of the present technology. The timing chart of FIG. 12 illustrates an example in the case of using the image sensor 21 that implements the WDR function without overlapping pixel signal reading timings. The image sensor 21 has a function of outputting data of three frames having different accumulation times for each of lines of each of frames, making it possible to improve image quality at low illuminance. Note that FIG. 12 illustrates a case where double exposure is used, that is, two images are obtained by exposure of one frame.

In this example, two normal processing frames (NML1, NML2) (that is, single exposure frame) are followed by an ATR processing frame ATR. In FIG. 12, tx (x is a number) represents time and XVS represents a vertical synchronization signal. This also applies to the other figures in a similar manner.

Regarding a long accumulation signal 102L of the normal processing frame NML2, exposure of the first line is started at time t13 between the vertical synchronization signal XVS1 and the vertical synchronization signal XVS2, and the exposure finishes at time t17 between the vertical synchronization signal XVS2 and a vertical synchronization signal XVS3. Thereafter, exposure of the second and subsequent lines is sequentially performed, with the exposure of the last line starting at time t16, and finishing at time t20. Accordingly, line 102Lh represents a timing of starting exposure of each of lines, while line 102Le represents a timing of finishing exposure. In addition, since reading is performed immediately after exposure is finished, line 102Le also indicates the timing of reading.

With respect to a short accumulation signal 102S corresponding to the long accumulation signal 102L, exposure of the first line is started immediately after time t17 being a finish time of the exposure of the first line of the long accumulation signal 102L, and finishes at time t18. Similarly, the exposure of each of lines of the short accumulation signal 102S is sequentially performed immediately after the finish of the exposure of each of lines of the long accumulation signal 102L. Then, the exposure of the last line of the short accumulation signal 102S finishes at time t21. In this case, line 102Sh represents a timing of starting exposure of each of lines of the short accumulation signal 102S, and line 102Se represents the timing of finishing exposure of each of lines. In addition, since reading is performed immediately after exposure is finished, line 102Se also indicates the timing of reading.

Note that for the sake of convenience, the short accumulation signal 102S is illustrated under the long accumulation signal 102L. However, to be exact, the short accumulation signal 102S should be arranged beside the long accumulation signal 102L (so as to arrange the line 102Sh of the short accumulation signal 102S to be in contact with the line 102Le of the long accumulation signal 102L). This also applies to other signals in a similar manner. Furthermore, the exposure time (time from time t17 to time t18) of the short accumulation signal 102S is sufficiently shorter than the exposure time (time from time t13 to time t17) of the long accumulation signal 102L.

With respect to a long accumulation signal 103L of a frame ATR of the ATR processing next to the normal processing frame NML2, exposure of the first line is started at time t19 between the vertical synchronization signal XVS2 and the vertical synchronization signal XVS3. Then, the exposure finishes at time t23 between the vertical synchronization signal XVS3 and a vertical synchronization signal XVS4. Thereafter, exposure of the second and subsequent lines is sequentially performed, with the exposure of the last line starting at time t25, and finishing at time t26. Accordingly, line 103Lh represents a timing of starting exposure of each of lines, while line 103Le represents a timing of finishing exposure. In addition, since reading is performed immediately after exposure is finished, line 103Le also indicates the timing of reading.

With respect to a short accumulation signal 103S corresponding to the long accumulation signal 103L, exposure of the first line is started immediately after time t23 being a finish time of the exposure of the first line of the long accumulation signal 103L, and finishes at time t24. Similarly, the exposure of each of lines of the short accumulation signal 103S is sequentially performed immediately after the finish of the exposure of each of lines of the long accumulation signal 103L. Then, the exposure of the last line of the short accumulation signal 103S finishes at time t27. In this case, line 103Sh represents a timing of starting exposure of each of lines of the short accumulation signal 103S, and line 103Se represents the timing of finishing exposure of each of lines. In addition, since reading is performed immediately after exposure is finished, line 103Se also indicates the timing of reading.

While the exposure condition of the short accumulation signal 102S of the frame NML2 of the normal processing can be set differently from the exposure condition of the short accumulation signal 103S of the frame ATR of the ATR processing, the same setting is used in this example. That is, the time from time t17 to time t18, which is the exposure time of the short accumulation signal 102S, is the same as the time from time t23 to time t24, which is the exposure time of the short accumulation signal 103S. The update of the ATR examination data is set at time t22 immediately after time t21 being the finishing time of the exposure of the last line of the short accumulation signal 102S. That is, examination data is updated from examination data 21 to examination data 22 at time t22.

Note that this example does not use the short accumulation signal 101S at the timing subsequent to the long accumulation signal 101L of the normal processing frame NML1 and thus, the exposure thereof is not performed. Alternatively, the signal is not read or is not used even when it is read.

Figure 13:
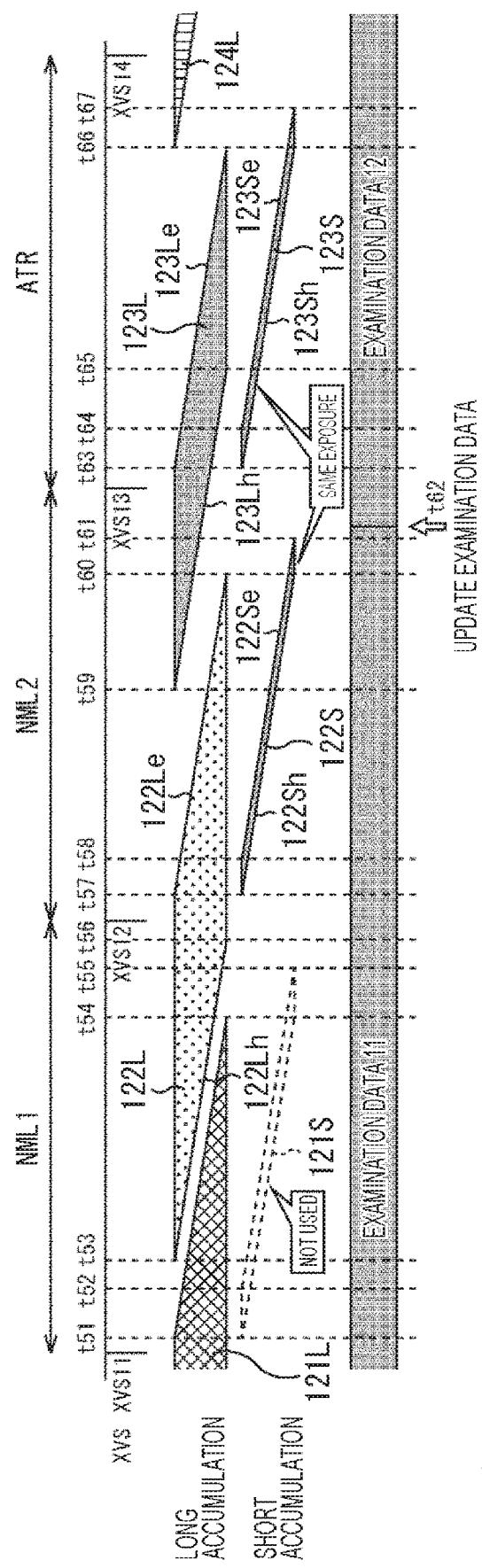
FIG. 13 is a timing chart illustrating timings of exposure control according to an embodiment of the present technology.

FIG. 13 is a timing chart illustrating timings of exposure control according to an embodiment of the present technology. This example represents a timing chart in a case where the image sensor 21 uses a method in which pixel signals of pixels of a plurality of frames are simultaneously read. Since timings are similar to the case of FIG. 12, its description will be omitted. In this method, similarly to the case of the example of FIG. 12, it is possible to start exposure of the next frame while reading a signal of one frame.

Figure 14:
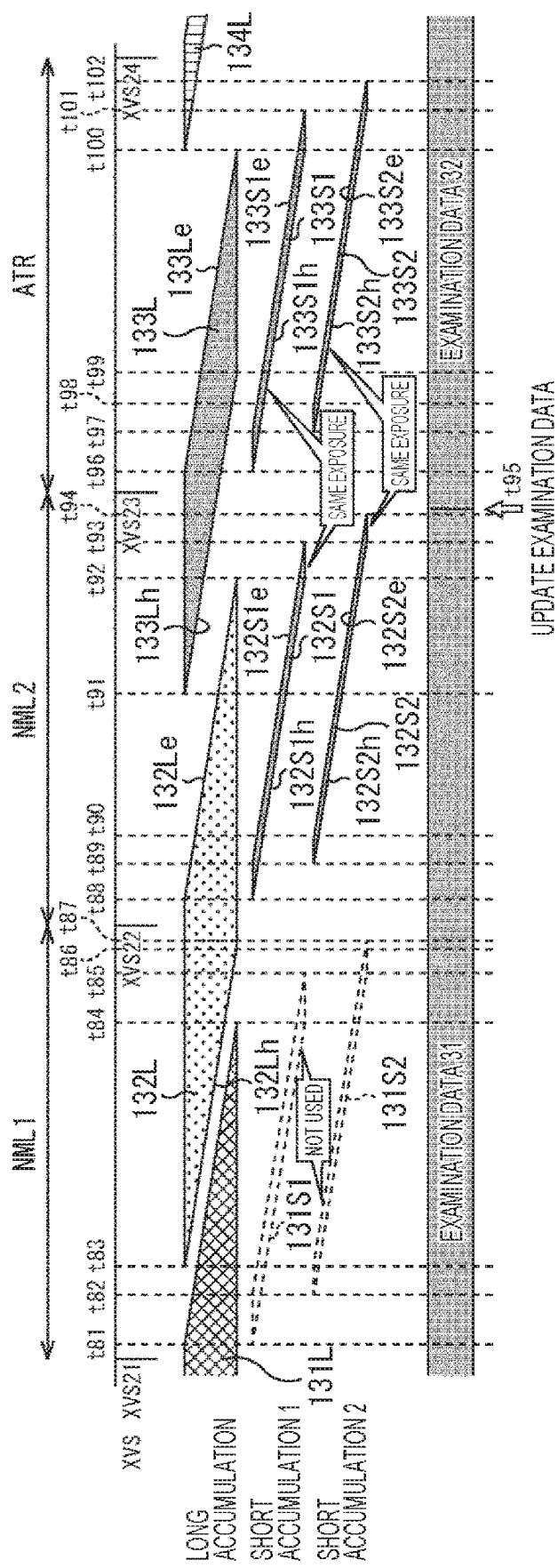
FIG. 14 is a timing chart illustrating timings of exposure control according to an embodiment of the present technology.

FIG. 14 is a timing chart illustrating timings of exposure control according to an embodiment of the present technology. Similarly to the example of FIG. 12, FIG. 14 illustrates an example of reading one long accumulation signal and two short accumulation signals in each of frames by using the image sensor 21 that implements the WDR function without overlapping the reading timings of the pixel signals. That is, this example illustrates a timing chart of triple exposures.

Since the exposure timings of the long accumulation signal and the first short accumulation signal are similar to the case of the double exposure of FIG. 12, the description thereof will be omitted, and description of the timing of the second short accumulation signal alone will be added.

The signal of the normal processing frame NML1 includes a long accumulation signal 131L, a first short accumulation signal 131S1, and a second short accumulation signal 131S2, while the signal of the normal processing frame NML2 includes a long accumulation signal 132L, a first short accumulation signal 132S1, and a second short accumulation signal 132S2 The signal of the frame ATR of the ATR processing includes a long accumulation signal 133L, a first short accumulation signal 133S1, and a second short accumulation signal 133S2.

With respect to the second short accumulation signal 132S2 corresponding to the long accumulation signal 132L of the frame NML2 of the normal processing, exposure of the first line is started immediately after time t89 being the finish time of the exposure of the first line of the first short accumulation signal 132S1, and finishes at time t90. Similarly, the exposure of each of lines of the second short accumulation signal 132S2 is sequentially started immediately after the finish of the exposure of each of lines of the first short accumulation signal 132S1. Then, the exposure of the last line of the second short accumulation signal 132S2 finishes at time t94. In this case, line 132S2h represents a timing of starting exposure of each of lines of the second short accumulation signal 132S2, and line 132S2e represents the timing of finishing exposure of each of lines. In addition, since reading is performed immediately after exposure is finished, line 132S2e also indicates the timing of reading.

Note that for the sake of convenience, the second short accumulation signal 132S2 is illustrated under the first short accumulation signal 132S1. However, to be exact, the second short accumulation signal 132S2 should be arranged beside the first short accumulation signal 132S1 (so as to arrange line 132S2h of the second short accumulation signal 132S2 to be in contact with line 132S1e of the first short accumulation signal 132S1). This also applies to other signals in a similar manner.

With respect to the second short accumulation signal 133S2 corresponding to the long accumulation signal 133L of the frame ATR of the ATR processing, exposure of the first line is started immediately after time t97 being a finish time of the exposure of the first line of the first short accumulation signal 133S1, and finishes at time t98. Similarly, the exposure of each of lines of the second short accumulation signal 133S2 is sequentially started immediately after the finish of the exposure of each of lines of the first short accumulation signal 133S1. Then, the exposure of the last line of the second short accumulation signal 133S2 finishes at time t102. In this case, line 133S2h represents a timing of starting exposure of each of lines of the second short accumulation signal 133S2, and line 133S2e represents the timing of finishing exposure of each of lines. In addition, since reading is performed immediately after exposure is finished, the line 133S2e also indicates the timing of reading.

The exposure conditions of the long accumulation signal 132L, the first short accumulation signal 132S1, and the second short accumulation signal 132S2 of the normal processing frame NML2 can be set differently from the exposure conditions of the long accumulation signal 133L of the ATR processing frame ATR, the first short accumulation signal 133S1, and the second short accumulation signal 133S2, respectively. However, this example uses the exposure condition of the first short accumulation signal 132S1 of the normal processing frame NML2 same as the exposure condition of the first short accumulation signal 133S1 of the frame ATR of the ATR processing. Similarly, the exposure condition of the second short accumulation signal 132S2 is the same as the exposure condition of the second short accumulation signal 133S2 of the frame ATR of the ATR processing. Note that in this example, the exposure time (time from time t89 to time t90) of the second short accumulation signal 132S2 is shorter than the exposure time (time from time t88 to time t89) of the first short accumulation signal 132S1. The update of the ATR examination data is set at time t95 immediately after time t94 being the finishing time of the exposure of the last line of the short accumulation signal 132S2. That is, examination data is updated from examination data 31 to examination data 32 at time t95.

Furthermore, this example does not use the second short accumulation signal 131S2 at the timing subsequent to the long accumulation signal 131L of the normal processing frame NML1 similarly to the case of the first short accumulation signal 131S1, and thus, the exposure thereof is not performed. Alternatively, the signal is not read or is not used even when it is read.

Figure 15:
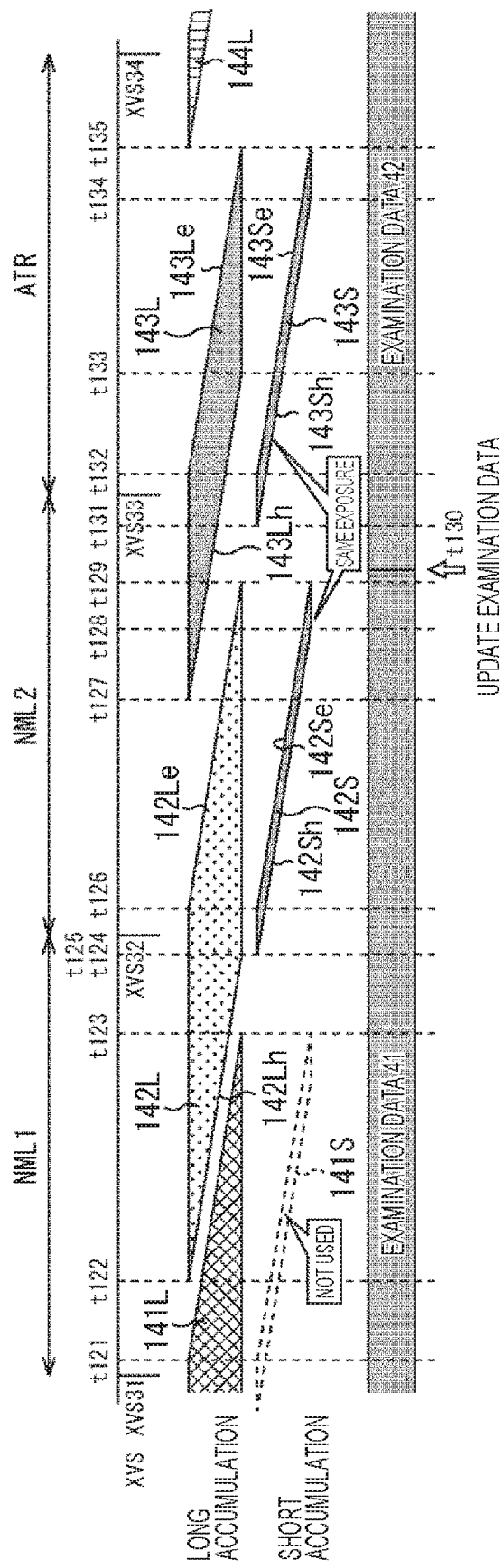
FIG. 15 is a timing chart illustrating timings of exposure control according to an embodiment of the present technology.

FIG. 15 is a timing chart illustrating timings of exposure control according to an embodiment of the present technology. This example illustrates a timing chart in a case where the image sensor 21 includes a photoreceptor including high sensitivity pixels and a photoreceptor including low sensitivity pixels, for each of pixels.

The timing chart of FIG. 15 is basically similar to the timing chart of FIG. 12. However, the exposure timing of the short accumulation signal is different. Specifically, the exposure of the first line of the short accumulation signal 142S of the normal processing frame NML2 is performed from time t125 to time t126 between a vertical synchronization signal XVS31 and a vertical synchronization signal XVS32. The exposure of the last line is performed from time t128 to time t129 between the vertical synchronization signal XVS32 and a vertical synchronization signal XVS33. In other words, the finish time of the exposure of the last line of the short accumulation signal 142S is the same time t129 being the finish time of the exposure of the last line of the long accumulation signal 142L. That is, in the case of this example, when the exposure of the long accumulation signal 142L has not been finished, the exposure of the short accumulation signal 142S is executed simultaneously so as to allow some of the timings to overlap.

The exposure of the first line of the short accumulation signal 143S of the ATR processing frame ATR is performed from time t131 between the vertical synchronization signal XVS32 and the vertical synchronization signal XVS33 to time t132 between the vertical synchronization signal XVS33 and a vertical synchronization signal XVS34. The exposure of the last line is performed from time t134 to time t135 between the vertical synchronization signal XVS33 and the vertical synchronization signal XVS34. In other words, the finish time of the exposure of the last line of the short accumulation signal 143L is the same time t135 being the finish time of the exposure of the last line of the long accumulation signal 143S.

The exposure conditions of the long accumulation signal 142L and the short accumulation signal 142S of the normal processing frame NML2 can be set differently from the exposure conditions of the long accumulation signal 143L and the short accumulation signal 143S of the frame ATR of the ATR processing. However, this example uses the setting of the exposure condition of the short accumulation signal 142S of the normal processing frame NML2 same as the exposure condition of the short accumulation signal 143S of the frame ATR of the ATR processing.

Note that this example does not use the short accumulation signal 141S at the timing subsequent to the long accumulation signal 141L of the normal processing frame NML1 and thus, the exposure thereof is not performed. Alternatively, the signal is not read or is not used even when it is read.

Furthermore, even in the case where the image sensor 21 is another image sensor having a configuration capable of electronically changing the exposure setting for each of pixels, the timing chart is similar to that of FIG. 15.

(7) Reflecting Exposure Control

Figure 16:
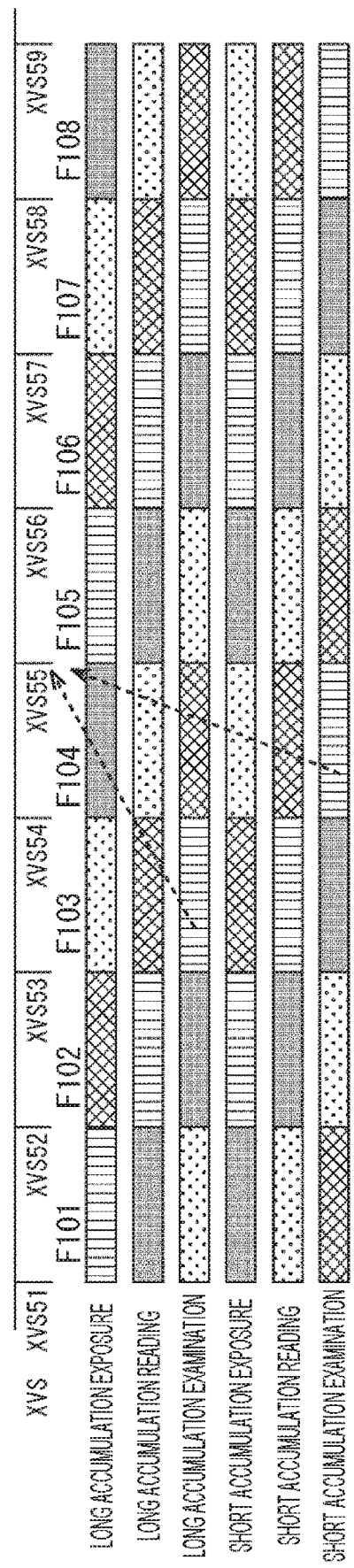
FIG. 16 is a timing chart illustrating timings of reflecting exposure information according to an embodiment of the present technology.

FIG. 16 is a timing chart illustrating timings of reflecting the exposure control according to an embodiment of the present technology. A short accumulation signal of the preceding frame can be used for the exposure control of the succeeding frame. FIG. 16 illustrates a timing chart in this case.

In the embodiment of FIG. 16, WDR exposure is not performed, and normal exposure is performed. In this example, a long accumulation exposure is performed in a frame F101, a long exposure signal is read in a next frame F102, and then, examination (long accumulation examination) is further performed in a next frame F103 on the basis of the read long accumulation signal.

A short accumulation exposure is performed in the frame F102 where the long accumulation signal is being read, while a short accumulation signal is read in the frame F103 where the next long accumulation examination is being performed. Then, examination is performed on the basis of the read short accumulation signal (short accumulation examination is performed) in a next frame F104.

Processing similar to the above-described frames F101 to F104 is also performed in subsequent cycles of frames F105 to F108.

Results of the time long accumulation examination of the frame F103 and the short accumulation examination of the frame F104 are transmitted at a timing of a vertical synchronization signal XVS55 between the frame F104 and the frame F105, and are reflected onto the next cycle. In this manner, the short accumulation signal can be effectively utilized to reflect the exposure information of three frames before. That is, the image of the succeeding frame F105 is controlled on the basis of exposure information of the short accumulation exposure performed in the preceding frame F102, being the frame three frames before.

This embodiment performs exposure control by using the examination data of the short accumulation signal three frames before, making it possible to quickly follow the change in brightness.

Figure 17:
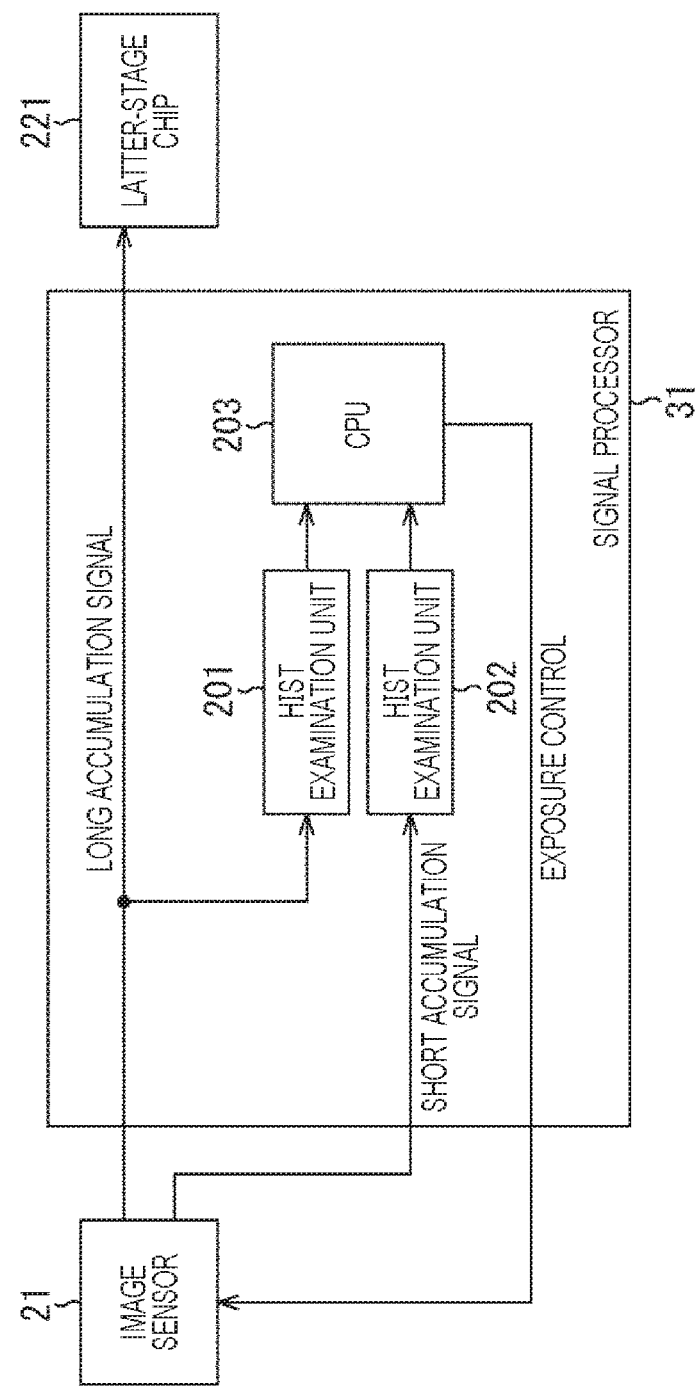
FIG. 17 is a block diagram illustrating a configuration of a signal processor according to an embodiment of the present technology.

FIG. 17 is a block diagram illustrating a configuration of a signal processor according to an embodiment of the present technology. That is, FIG. 17 illustrates a configuration example of the signal processor 31 that executes the processing of FIG. 16.

In this example, the signal processor 31 includes a HIST examination unit 201, a HIST examination unit 202, and a central processing unit (CPU) 203. A long accumulation signal output from the image sensor 21 is supplied to a latter-stage chip 221 provided outside the signal processor 31, and is also supplied to the HIST examination unit 201. A short accumulation signal output from the image sensor 21 is supplied to the HIST examination unit 202. Note that the latter-stage chip 221 includes a recognition block 13 of FIG. 1, for example.

The HIST examination unit 201 examines the input long accumulation signal. That is, examination processing similar to the HIST examination unit 53 in FIG. 4 is applied to the long accumulation signal. The long accumulation examination is processing performed in frames F103 and F107 in FIG. 16. The examination result is read by a register and supplied to the CPU 203.

The HIST examination unit 202 examines the input short accumulation signal. That is, examination processing similar to the HIST examination unit 53 in FIG. 4 is performed on the short accumulation signal. This short accumulation examination is processing performed in frames F104 and F108 of FIG. 16. The examination result is read by a register and supplied to the CPU 203.

The CPU 203 controls the exposure conditions of the long accumulation and short accumulation of the image sensor 21 on the basis of the results of examinations performed by one or both of the HIST examination unit 201 and the HIST examination unit 202. Since the exposure time is shorter in the short accumulation signal, a range with a wider dynamic range is examined. Therefore, in a case where the dynamic range varies, it is possible to send a feedback one frame earlier to the exposure control of the long accumulation signal.

Figure 18:
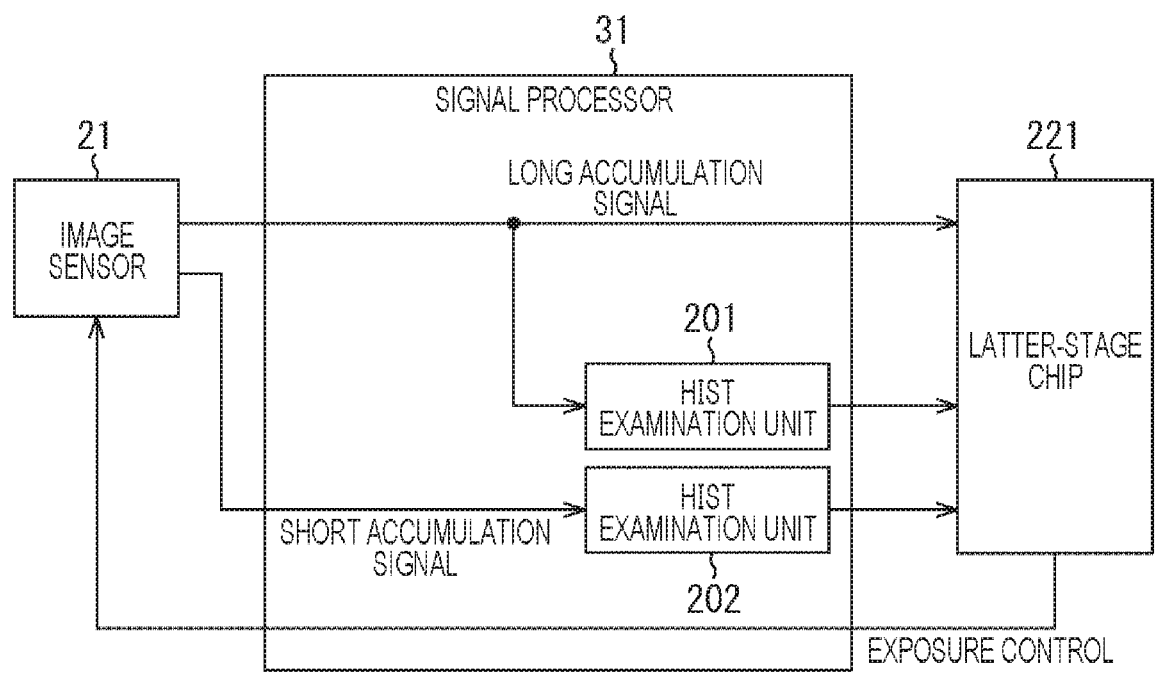
FIG. 18 is a block diagram illustrating a configuration of a signal processor according to an embodiment of the present technology.

FIG. 18 is a block diagram illustrating a configuration of a signal processor according to an embodiment of the present technology. FIG. 18 also illustrates a configuration example of the signal processor 31 that executes the processing of FIG. 16. In this example, the CPU 203 of FIG. 17 is omitted, and the outputs of the HIST examination unit 201 and the HIST examination unit 202 are supplied to the external latter-stage chip 221. In addition, the latter-stage chip 221 externally controls the exposure condition of the image sensor 21 in place of the CPU 203 of FIG. 17.

In the above description, a histogram is generated using the short accumulation signal or the long accumulation signal. Alternatively, however, it is also possible to use a signal having a dynamic range expanded by a combined gain obtained by appropriately combining the long accumulation signal and the short accumulation signal. Hereinafter, an example of this case will be described with reference to FIG. 19.

Figure 19:
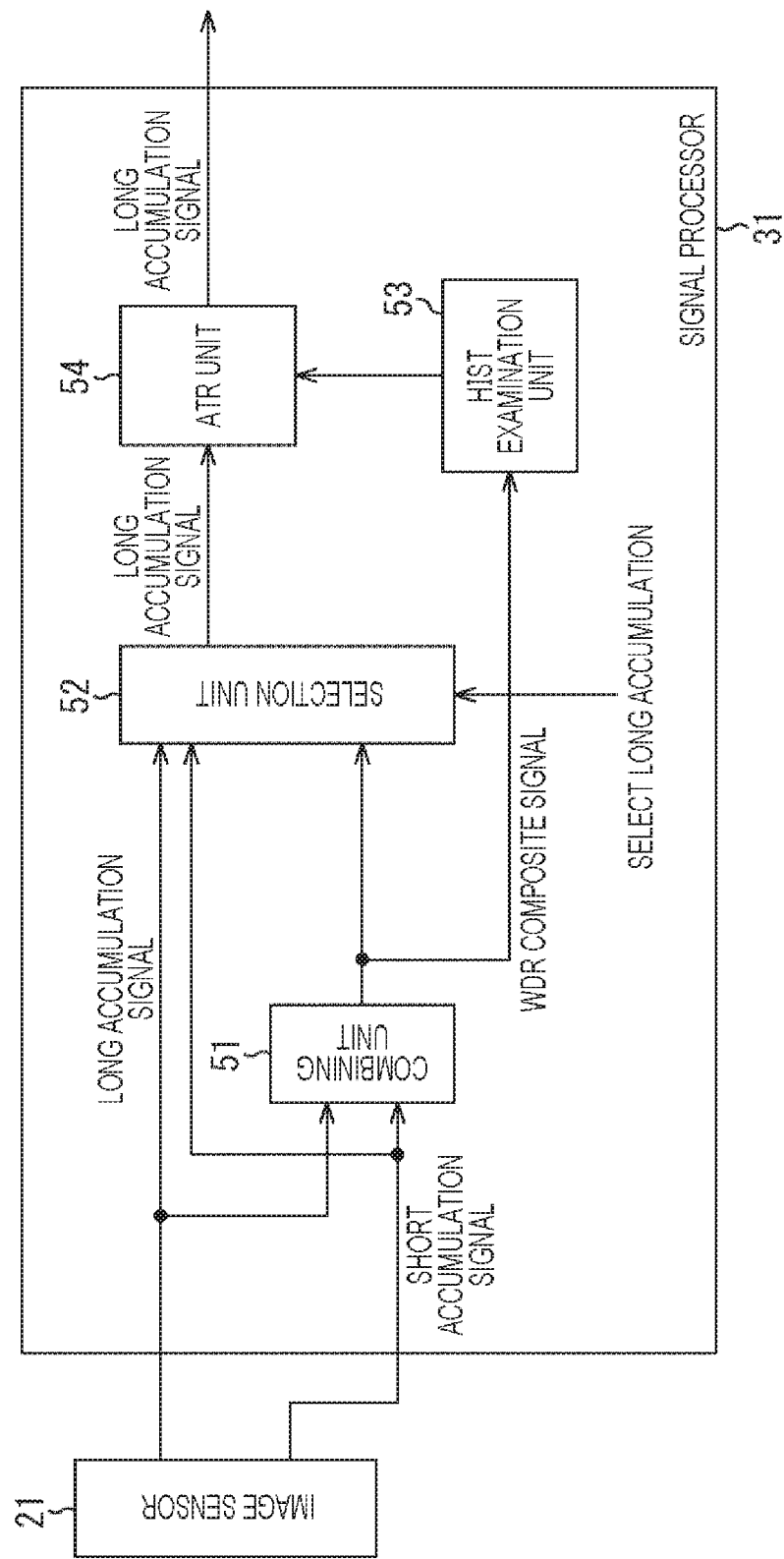
FIG. 19 is a block diagram illustrating a configuration of a signal processor according to an embodiment of the present technology.

FIG. 19 is a block diagram illustrating a configuration of a signal processor according to an embodiment of the present technology. While the basic configuration of the signal processor 31 of FIG. 19 is similar to that of FIG. 4, this example illustrates a configuration to supply the WDR composite signal from the combining unit 51 to the HIST examination unit 53, instead of the short accumulation signal. The combining unit 51 combines the long accumulation signal and the short accumulation signal of the normal processing frame NML from the image sensor 21 to generate a WDR composite signal and supplies the generated signal to the HIST examination unit 53. The HIST examination unit 53 generates a tone conversion curve. This tone conversion curve is used later for ATR processing of the frame ATR.

The selection unit 52 selects solely the long accumulation signal output from the image sensor 21 and outputs it to the ATR unit 54. The ATR unit 54 outputs the input long accumulation signal as it is to the recognition unit 41 of the subsequent stage. Note that while the exposure of the short accumulation signal is set to correspond to the exposure of the short accumulation signal of the frame ATR, the exposure of the long accumulation signal is set so as to be appropriate for a recognition processing target.

In this example, the long accumulation signal is also used for the HIST examination, making it possible to supplement the histogram of the low luminance portion. A large number of tones are usually allocated to low luminance portions, providing the long accumulation signal with a higher resolution in low luminance portions. Therefore, it is possible to optimize the tone allocation by using the long accumulation signal.

Note that FIGS. 4 and 17 to 19 are the case of combining two images as an example, while three images can be combined.

Note that while the above description is a case of using HIST examination as examination, it is also allowable to use photometric examination such as auto exposure (AE).

In the case where a frame memory for storing one image is provided, examination and tone conversion can be performed simultaneously on the stored image. The present technology, however, is applicable to the case where such a frame memory is not provided. Of course, the present technology can be applied even in a case where a frame memory is provided.

2. Application Example

The technology according to the present disclosure can be applied to various products. For example, the technology according to the present disclosure may be implemented as an apparatus mounted on any type of vehicle such as an automobile, an electric vehicle, a hybrid electric vehicle, or a motorcycle.

Figure 20:
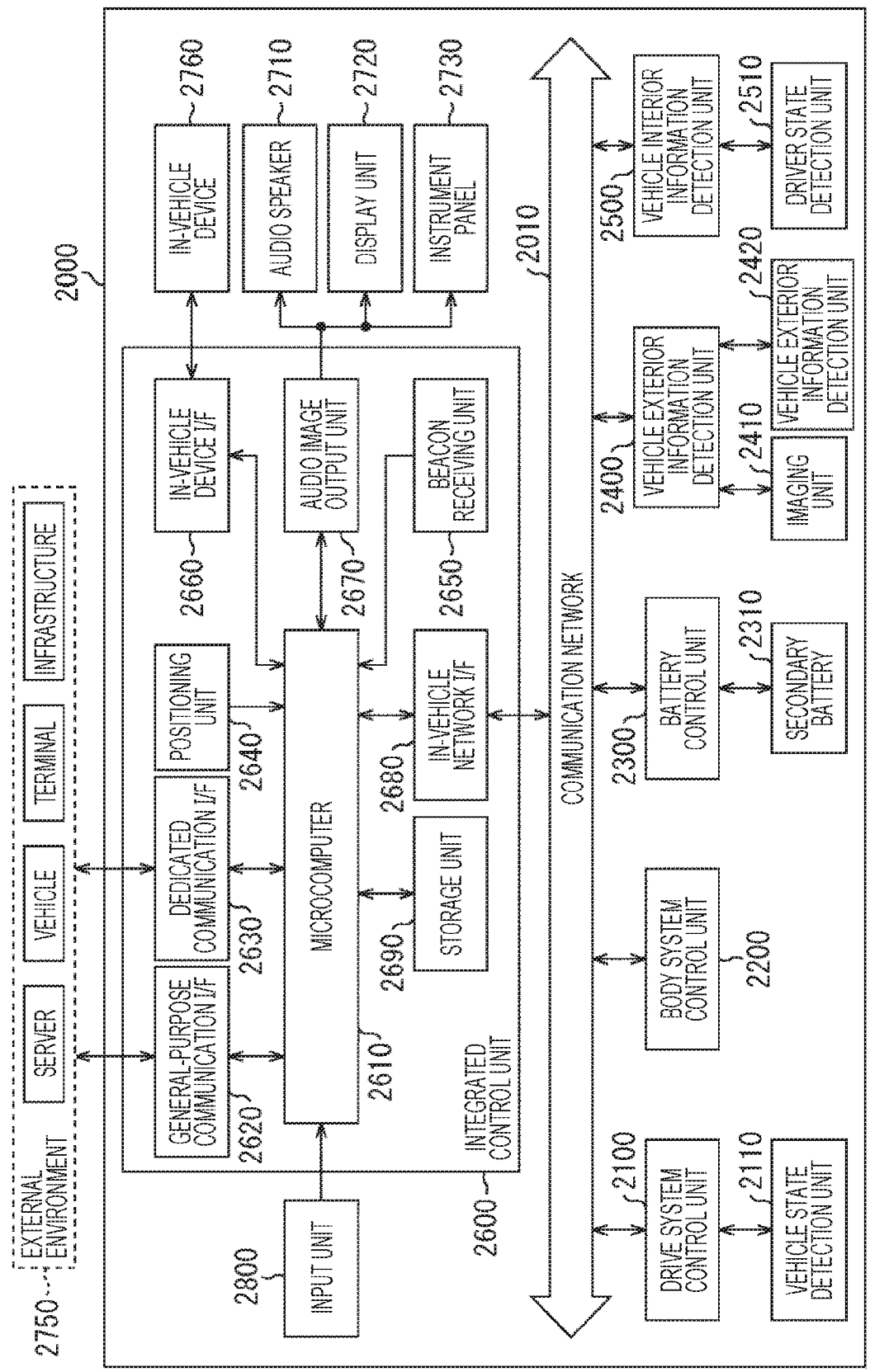
FIG. 20 is a block diagram illustrating a schematic configuration example of a vehicle control system.

FIG. 20 is a block diagram illustrating an example of a schematic configuration of a vehicle control system 2000 to which the technology according to the present disclosure can be applied. The vehicle control system 2000 includes a plurality of electronic control units connected via a communication network 2010. In the example illustrated in FIG. 20, the vehicle control system 2000 includes a drive system control unit 2100, a body system control unit 2200, a battery control unit 2300, an vehicle exterior information detection apparatus 2400, an vehicle interior information detection apparatus 2500, and an integrated control unit 2600. The communication network 2010 connecting the plurality of control units may be an in-vehicle communication network conforming to a certain standard such as a Controller Area Network (CAN), a Local Interconnect Network (LIN), a Local Area Network (LAN), or FlexRay (registered trademark), for example.

Each of the control units includes: a microcomputer that performs arithmetic processing in accordance with various programs; a storage unit that stores programs executed by the microcomputer, parameters used for various calculations, or the like; and a drive circuit that drives devices to be controlled. Each of the control units includes: a network I/F for communicating with another control unit via the communication network 2010; and a communication I/F for performing communication with internal or external devices of the vehicle, a sensor, or the like, using wired communication or wireless communication. FIG. 20 illustrates, as a functional configuration of the integrated control unit 2600, units such as a microcomputer 2610, a general-purpose communication I/F 2620, a dedicated communication I/F 2630, a positioning unit 2640, a beacon receiving unit 2650, an in-vehicle device I/F 2660, an audio image output unit 2670, an in-vehicle network I/F 2680, and a storage unit 2690. Similarly, the other control units include a microcomputer, a communication I/F, a storage unit, or the like.

The drive system control unit 2100 controls operation of the apparatus related to the drive system of the vehicle in accordance with various programs. For example, the drive system control unit 2100 functions as a control apparatus of a driving force generation apparatus that generates a driving force of a vehicle such as an internal combustion engine or a driving motor, a driving force transmission mechanism that transmits a driving force to the wheels, a steering mechanism that adjusts steering angle of the vehicle, a braking apparatus that generates a braking force of the vehicle, and the like. The drive system control unit 2100 may have a function as a control apparatus such as Antilock Brake System (ABS), or Electronic Stability Control (ESC).

The drive system control unit 2100 is connected with a vehicle state detection unit 2110. The vehicle state detection unit 2110 includes at least one of: a gyro sensor that detects angular velocity of the rotational motion of the vehicle body; an acceleration sensor that detects acceleration of the vehicle; or a sensor for detection an operation amount of the accelerator pedal, an operation amount of the brake pedal, steering angle of the steering wheel, and an engine rotation speed, a wheel rotation speed, or the like, for example. The drive system control unit 2100 performs arithmetic processing by using a signal input from the vehicle state detection unit 2110 so as control the internal combustion engine, the drive motor, the electric power steering device, the brake device, or the like.

The body system control unit 2200 controls operation of various devices equipped on the vehicle body in accordance with various programs. For example, the body system control unit 2200 functions as a control apparatus for a keyless entry system, a smart key system, a power window device, or various lamps such as a head lamp, a back lamp, a brake lamp, a turn signal lamp, or a fog lamp. In this case, the body system control unit 2200 can receive inputs of a radio wave transmitted from a portable device that substitutes a key, or a signal of various switches. The body system control unit 2200 receives inputs of these radio waves or signals and controls the door lock device, the power window device, the lamp, etc. of the vehicle.

The battery control unit 2300 controls a secondary battery 2310 being a power supply source for the driving motor in accordance with various programs. For example, the battery control unit 2300 receives an input of information such as battery temperature, the battery output voltage, or the remaining battery capacity from a battery apparatus including the secondary battery 2310. The battery control unit 2300 performs arithmetic processing by using these signals so as to perform temperature adjustment control of the secondary battery 2310 or control of the cooling device or the like included in the battery apparatus.

The vehicle exterior information detection apparatus 2400 detects information outside the vehicle equipped with the vehicle control system 2000. For example, the vehicle exterior information detection apparatus 2400 is connected to at least one of the imaging unit 2410 or a vehicle exterior information detection unit 2420. The imaging unit 2410 includes at least one of a Time-of-flight (ToF) camera, a stereo camera, a monocular camera, an infrared camera, or other camera. For example, the vehicle exterior information detection unit 2420 includes: an environmental sensor that detects current weather or climate, or an ambient information detection sensor that detects another vehicle, an obstacle, a pedestrian, or the like, surrounding the vehicle equipped with the vehicle control system 2000.

The environmental sensor may be, for example, at least one of a raindrop sensor for detecting rain, a fog sensor for detecting mist, a sunshine sensor for detecting sunshine degree, or a snow sensor for detecting snowfall. The ambient information detection sensor may be at least one of an ultrasonic sensor, a radar apparatus, or a light detection and ranging/laser imaging detection and ranging (LIDAR) apparatus. The imaging unit 2410 and the vehicle exterior information detection unit 2420 may be each provided as independent sensors or devices, or may be provided as a device integrating a plurality of sensors or devices.

Figure 21:
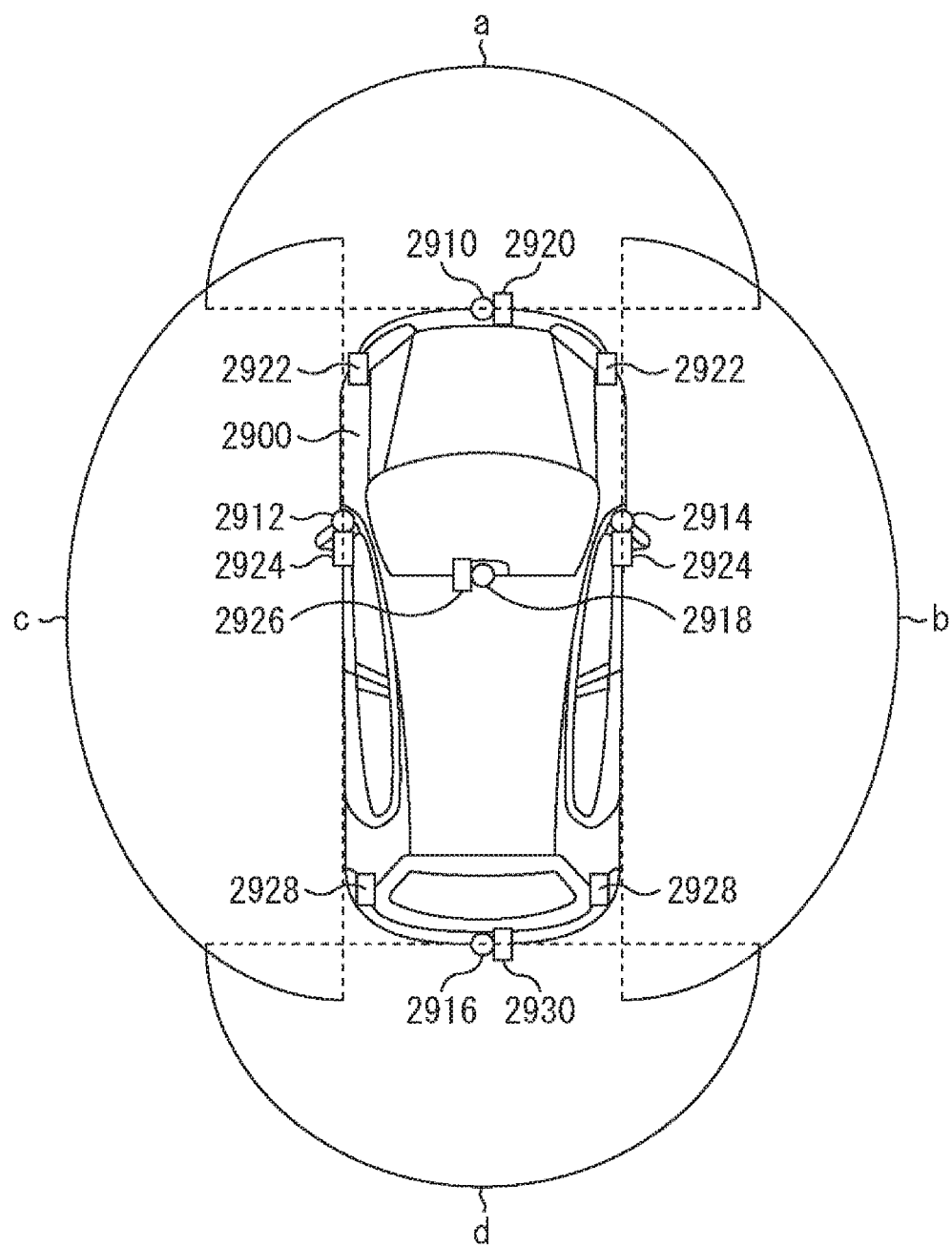
FIG. 21 is an explanatory diagram illustrating an example of installation positions of a vehicle exterior information detection unit and an imaging unit.

Here, FIG. 21 illustrates an example of installation positions of the imaging unit 2410 and the vehicle exterior information detection unit 2420. For example, imaging units 2910, 2912, 2914, 2916, and 2918 are provided at at least one of positions on a vehicle 2900, including a nose, a side mirror, a rear bumper, a rear door, or an upper portion of windshield in a passenger compartment. The imaging unit 2910 provided at a nose and the imaging unit 2918 provided on the upper portion of the windshield in the vehicle compartment mainly obtain an image ahead of the vehicle 2900. The imaging units 2912 and 2914 provided at the side mirror mainly obtain images of the side of the vehicle 2900. The imaging unit 2916 provided in the rear bumper or the back door mainly obtains an image behind the vehicle 2900. The imaging unit 2918 provided at an upper portion of the windshield in the passenger compartment is mainly used for detecting a preceding vehicle, a pedestrian, an obstacle, a traffic signal, a traffic sign, a lane, or the like.

Note that FIG. 21 illustrates an example of photographing ranges of each of the imaging units 2910, 2912, 2914, and 2916. An imaging range a represents an imaging range of the imaging unit 2910 provided at the nose, imaging ranges b and c represent imaging ranges of the imaging units 2912 and 2914 provided at the side mirror, and an imaging range d represents an imaging range of the imaging unit 2916 provided at the rear bumper or the back door. For example, the image data captured by the imaging units 2910, 2912, 2914, or 2916 to obtain an overhead view image of the vehicle 2900 viewed from above.

Each of the vehicle exterior information detection units 2920, 2922, 2924, 2926, 2928, and 2930 provided on the front, rear, side, corner, and an upper portion of the windshield in the passenger compartment, of the vehicle 2900, may be an ultrasonic sensor or a radar apparatus, for example. The vehicle exterior information detection units 2920, 2926, and 2930 provided on the nose, the rear bumper, the back door, and an upper portion of the windshield in the passenger compartment, of the vehicle 2900, may be LIDAR apparatuses, for example. The vehicle exterior information detection units 2920 to 2930 are mainly used for detecting a preceding vehicle, a pedestrian, an obstacle, or the like.

Returning to FIG. 20, the description will be continued. The vehicle exterior information detection apparatus 2400 causes the imaging unit 2410 to capture an image of the outside of the vehicle and receives the captured image data. Furthermore, the vehicle exterior information detection apparatus 2400 receives detection information from the connected vehicle exterior information detection unit 2420. In a case where the vehicle exterior information detection unit 2420 is an ultrasonic sensor, a radar apparatus, or an LIDAR apparatus, the vehicle exterior information detection apparatus 2400 controls to transmit ultrasonic waves, electromagnetic waves, or the like, and receives information of the received reflected waves. The vehicle exterior information detection apparatus 2400 may perform object detection processing or distance detection processing on objects such as a person, a car, an obstacle, a sign, and a character on a road surface on the basis of the received information. The vehicle exterior information detection apparatus 2400 may perform environment recognition processing of recognizing rainfall, fog, road surface condition, or the like, on the basis of the received information. The vehicle exterior information detection apparatus 2400 may calculate the distance to the object outside the vehicle on the basis of the received information.

Furthermore, the vehicle exterior information detection apparatus 2400 may perform image recognition processing or distance detection processing of recognizing people, cars, obstacles, signs, characters on a road surface, or the like, on the basis of the received image data. The vehicle exterior information detection apparatus 2400 may perform processing such as distortion correction or alignment on the received image data and may combine the image data captured by mutually different imaging units 2410 to generate an overhead view image or a panoramic image. The vehicle exterior information detection apparatus 2400 may perform viewpoint conversion processing by using image data captured by mutually different imaging units 2410.

The vehicle interior information detection apparatus 2500 detects information inside the vehicle. The vehicle interior information detection apparatus 2500 is connected with a driver state detection unit 2510 that detects the state of the driver, for example. The driver state detection unit 2510 may include a camera that images the driver, a biometric sensor that detects biological information of the driver, a microphone that collects sounds in the passenger compartment, or the like. The biometric sensor is provided on a seating surface, a steering wheel, or the like, for example, and detects biological information of an occupant sitting on a seat or a driver holding a steering wheel. The vehicle interior information detection apparatus 2500 may calculate the degree of fatigue or the degree of concentration of the driver or may judge whether the driver is dozing off on the basis of the detection information input from the driver state detection unit 2510. The vehicle interior information detection apparatus 2500 may perform noise canceling processing or the like on collected audio signals.

The integrated control unit 2600 controls the overall operation within the vehicle control system 2000 in accordance with various programs. The integrated control unit 2600 is connected with an input unit 2800. The input unit 2800 is implemented by an apparatus which can be operated by an input of an occupant, such as a touch screen, a button, a microphone, a switch, or a lever, for example. The input unit 2800 may be, for example, a remote control device using infrared rays or other radio waves, or an external connection device such as a mobile phone or a personal digital assistant (PDA) compatible with the operation of the vehicle control system 2000. The input unit 2800 may be a camera, for example, in which case the occupant can input information by gesture. Furthermore, the input unit 2800 may include, for example, an input control circuit or the like that generates an input signal on the basis of information input by an occupant or the like using the above input unit 2800 and outputs the generated input signal to the integrated control unit 2600. The occupant or the like operates the input unit 2800 so as to input various data or give an instruction on processing operation to the vehicle control system 2000.

The storage unit 2690 may include a random access memory (RAM) that stores various programs to be executed by the microcomputer, and a read only memory (ROM) that stores various parameters, calculation results, sensor values, or the like. Furthermore, the storage unit 2690 may be implemented by a magnetic storage device such as a hard disc drive (HDD), a semiconductor storage device, an optical storage device, a magneto-optical storage device, or the like.

The general-purpose communication I/F 2620 is a general-purpose communication I/F that mediates communication with various devices existing in external environment 2750. The general-purpose communication I/F 2620 may include a cellular communication protocol such as Global System of Mobile communications (GSM) (registered trademark), WiMAX, Long Term Evolution (LTE) or LTE-Advanced (LTE-A), a wireless LAN (also referred to as Wi-Fi (registered trademark)), or the like. The general-purpose communication I/F 2620 may be connected to a device (for example, an application server or a control server) existing on an external network (for example, the Internet, a cloud network or a company specific network) via a base station or an access point, for example. Furthermore, the general-purpose communication I/F 2620 may use Peer To Peer (P2P) technology, for example, to connect to a terminal (for example, a terminal of a pedestrian or a shop, or a machine type communication (MTC) terminal) existing in the vicinity of the vehicle.

The dedicated communication I/F 2630 is a communication I/F that supports a communication protocol formulated for the purpose of being used in a vehicle. For example, the dedicated communication I/F 2630 may implement a standard protocol such as Wireless Access in Vehicle Environment (WAVE) or Dedicated Short Range Communications (DSRC), which is a combination of lower layer IEEE 802.11p and upper layer IEEE 1609. Typically, the dedicated communication I/F 2630 implements V2X communication which is a concept including one or more of Vehicle to Vehicle communication, Vehicle to Infrastructure communication, and Vehicle to Pedestrian communication.

The positioning unit 2640 receives, for example, a GNSS (Global Navigation Satellite System) signal from a GNSS satellite (for example, a GPS (Global Positioning System) signal from a GPS satellite) to execute positioning, and generates position information including the latitude, longitude, and altitude of the vehicle. Note that the positioning unit 2640 may specify a current position by exchanging signals with a wireless access point or may obtain the position information from a terminal such as a mobile phone, a PHS or a smartphone, having a positioning function.

For example, the beacon receiving unit 2650 receives radio waves or electromagnetic waves transmitted from a radio station or the like installed on a road and obtains information such as the current position, congestion, closing of a road, or required time. Note that the function of the beacon receiving unit 2650 may be included in the dedicated communication I/F 2630 described above.

The in-vehicle device I/F 2660 is a communication interface that mediates connection between the microcomputer 2610 and various devices existing in a vehicle. The in-vehicle device I/F 2660 may establish a wireless connection using a wireless communication protocol such as wireless LAN, Bluetooth (registered trademark), near field communication (NFC), or a wireless USB (WUSB). Furthermore, the in-vehicle device I/F 2660 may establish a wired connection via a connection terminal (not illustrate) (and a cable, if necessary). The in-vehicle device I/F 2660 exchanges control signals or data signals with, for example, a mobile device or a wearable device owned by the occupant, or an information device loaded or mounted on the vehicle.

The in-vehicle network I/F 2680 is an interface mediating communication between the microcomputer 2610 and the communication network 2010. The in-vehicle network I/F 2680 transmits and receives signals or the like in accordance with a predetermined protocol supported by the communication network 2010.

The microcomputer 2610 of the integrated control unit 2600 controls the vehicle control system 2000 in accordance with various programs on the basis of information obtained via at least one of the general-purpose communication I/F 2620, the dedicated communication I/F 2630, the positioning unit 2640, the beacon receiving unit 2650, the in-vehicle device I/F 2660, or the in-vehicle network I/F2680. For example, the microcomputer 2610 may calculate a control target value of the driving force generation apparatus, the steering mechanism, or the braking apparatus on the basis of the obtained vehicle external/internal information and may output a control command to the drive system control unit 2100. For example, the microcomputer 2610 may perform cooperative control for the purpose of collision avoidance or shock absorption of a vehicle, following travel based on an inter-vehicle distance, speed holding travel, automatically driving, or the like.

The microcomputer 2610 may create local map information including peripheral information of the vehicle current position on the basis of information obtained via at least one of the general-purpose communication I/F 2620, the dedicated communication I/F 2630, the positioning unit 2640, the beacon receiving unit 2650, the in-vehicle device I/F 2660, or the in-vehicle network I/F 2680. Furthermore, on the basis of the obtained information, the microcomputer 2610 may predict danger such as vehicle collision, presence of a pedestrian, etc. in the vicinity, or entrance into a road closed to traffic and may generate a warning signal. The warning signal may be, for example, a signal for generating an alarm sound or for turning on a warning lamp.

The audio image output unit 2670 transmits an output signal in the form of at least one of audio or image to an output apparatus capable of visually or audibly notifying the occupant of the vehicle or the outside of the vehicle of information. In the example of FIG. 20, an audio speaker 2710, a display unit 2720, and an instrument panel 2730 are illustrated as exemplary output apparatuses. The display unit 2720 may include at least one of an on-board display or a head-up display, for example. The display unit 2720 may have an augmented reality (AR) display function. The output apparatus may be other apparatuses such as headphones, projectors, or lamps, other than these devices. In a case where the output apparatus is a display apparatus, the display apparatus visually displays results obtained by various processing performed by the microcomputer 2610 or information received from other control units in various formats such as text, image, table, or graph. Furthermore, in a case where the output apparatus is an audio output apparatus, the audio output apparatus audibly outputs an analog signal obtained by conversion of an audio signal constituted with the reproduced audio data, acoustic data, or the like.

Note that in the example illustrated in FIG. 20, at least two control units connected via the communication network 2010 may be integrated as one control unit. Alternatively, each of the control units may be constituted with a plurality of control units. In addition, the vehicle control system 2000 may include another control unit that is not illustrated. Furthermore, in the above description, some or all of the functions executed by any one of the control units may be provided by the other control unit. That is, as long as information is transmitted and received via the communication network 2010, predetermined arithmetic processing may be performed by any of the control units. Similarly, a sensor or a device connected to any control unit may be connected to another control unit, and a plurality of control units may exchange detection information with each other via the communication network 2010.

In the vehicle control system 2000 described above, the imaging controller 22 and the recognition block 13 according to the present embodiment described with reference to FIG. 1 can be applied to the integrated control unit 2600 of the application example illustrated in FIG. 20.

Furthermore, at least a portion of the components of the imaging controller 22 and the recognition block 13 described with reference to FIG. 1 may be implemented in a module for the integrated control unit 2600 illustrated in FIG. 20 (for example, integration circuit module constituted with one die). Alternatively, the imaging controller 22 and the recognition block 13 described with reference to FIG. 1 may be implemented by the plurality of control units of the vehicle control system 2000 illustrated in FIG. 20.

Note that a computer program for implementing individual functions of the imaging controller 22 and the recognition block 13 described with reference to FIG. 1 can be implemented in any of the control units, or the like. Furthermore, it is also possible to provide a computer readable recording medium storing such a computer program. The recording medium is, for example, a magnetic disk, an optical disk, a magneto-optical disk, a flash memory, or the like. Further, the above computer program may be delivered via a network, for example, without using a recording medium.

Note that embodiments of the present technology are not limited to the above-described embodiments but can be modified in a variety of ways within a scope of the present technology.

For example, the present technology can be configured as a form of cloud computing in which one function is shared in cooperation for processing among a plurality of apparatuses via a network.

Moreover, each of steps described in the above flowcharts can be executed on one apparatus or shared by a plurality of apparatuses for processing.

Furthermore, in a case where one step includes a plurality of stages of processing, the plurality of stages of processing included in the one step can be executed on one apparatus or can be shared by a plurality of apparatuses.

3. Others

The present technology may also be configured as below.
(1)
An imaging control apparatus including:
a controller that causes a short accumulation signal of a preceding frame to correspond to the short accumulation signal of a succeeding frame; and
a processor that uses the short accumulation signal of the preceding frame to process the signal of the succeeding frame.
(2)
The imaging control apparatus according to (1),
in which the controller causes short accumulation exposure for generating the short accumulation signal of the preceding frame to correspond to the short accumulation exposure for generating the short accumulation signal of the succeeding frame, and
the processor uses the short accumulation signal of the preceding frame to apply tone conversion on a composite signal of the short accumulation signal and a long accumulation signal of the succeeding frame.
(3)
The imaging control apparatus according to (1) or (2),
in which the preceding frame and the succeeding frame constitute an N-frame sequence.

(4)

The imaging control apparatus according to any of (1) to (3), further including an examination unit that applies histogram examination on the short accumulation signal of the preceding frame to generate a tone conversion curve, in which the processor performs tone conversion on the basis of the tone conversion curve.

(5)

The imaging control apparatus according to any of (1) to (4), in which the examination unit applies histogram examination on a composite signal obtained by combining the short accumulation signal and the long accumulation signal of the preceding frame.

(6)

The imaging control apparatus according to any of (1) to (5), in which the controller controls exposure of the succeeding frame on the basis of the short accumulation signal of the preceding frame.

(7)

The imaging control apparatus according to any of (1) to (6), further including a recognition unit that recognizes a recognition target from the signal that has undergone tone conversion.

(8)

An imaging control method including:

a step of causing a short accumulation signal of a preceding frame to correspond to the short accumulation signal of a succeeding frame; and a step of using the short accumulation signal of the preceding frame to process the signal of the succeeding frame.

(9)

A vehicle including:

a photographing unit that outputs a short accumulation signal and a long accumulation signal of a photographed image;

a controller that causes the short accumulation signal of a preceding frame to correspond to the short accumulation signal of a succeeding frame;

a processor that uses the short accumulation signal of the preceding frame to process the signal of the succeeding frame; and a recognition unit that recognizes a recognition target from the processed signal.

REFERENCE SIGNS LIST

11 Optical system
12 Imaging block
13 Recognition block
21 Image sensor
31 Signal processor
32 Timing controller
41 Recognition unit
51 Combining unit
52 Selection unit
53 HIST examination unit
54 ATR unit

The invention claimed is:

1. An imaging control apparatus, comprising:
a controller configured to cause a short accumulation signal of a preceding frame to correspond to a short accumulation signal of a succeeding frame, wherein the preceding frame and the succeeding frame constitute an N-frame sequence; and
a processor configured to:
apply histogram examination on a first composite signal to generate a tone conversion curve, wherein the first composite signal is a combination of the short accumulation signal of the preceding frame and a long accumulation signal of the preceding frame;
apply tone conversion on a second composite signal based on the tone conversion curve, wherein the second composite signal is a combination of the short accumulation signal of the succeeding frame and a long accumulation signal of the succeeding frame; and
process the succeeding frame based on the second composite signal that has undergone the tone conversion.

2. The imaging control apparatus according to claim 1, wherein
the controller is further configured to cause short accumulation exposure associated with the short accumulation signal of the preceding frame to correspond to short accumulation exposure associated with the short accumulation signal of the succeeding frame.

3. The imaging control apparatus according to claim 1, wherein the controller is further configured to control exposure of the succeeding frame based on the short accumulation signal of the preceding frame.

4. The imaging control apparatus according to claim 1, wherein the processor is further configured to recognize a recognition target based on the second composite signal that has undergone the tone conversion.

5. An imaging control method, comprising:
causing a short accumulation signal of a preceding frame to correspond to a short accumulation signal of a succeeding frame, wherein the preceding frame and the succeeding frame constitute an N-frame sequence; and
applying histogram examination on a first composite signal to generate a tone conversion curve, wherein the first composite signal is a combination of the short accumulation signal of the preceding frame and a long accumulation signal of the preceding frame;
applying tone conversion on a second composite signal based on the tone conversion curve, wherein the second composite signal is a combination of the short accumulation signal of the succeeding frame and a long accumulation signal of the succeeding frame; and
processing the succeeding frame based on the second composite signal that has undergone the tone conversion.

6. A vehicle, comprising:
an image sensor configured to output a short accumulation signal of a photographed image and a long accumulation signal of the photographed image;
a controller configured to cause a short accumulation signal of a preceding frame to correspond to a short accumulation signal of a succeeding frame, wherein the preceding frame and the succeeding frame constitute an N-frame sequence;
a processor configured to:
apply histogram examination on a first composite signal to generate a tone conversion curve, wherein the first composite signal is a combination of the short accumulation signal of the preceding frame and a long accumulation signal of the preceding frame; and
apply tone conversion on a second composite signal based on the tone conversion curve, wherein the second composite signal is a combination of the short accumulation signal of the succeeding frame and a long accumulation signal of the succeeding frame; and recognize a recognition target based on the second composite signal that has undergone the tone conversion.

7. An imaging control apparatus, comprising:

a controller configured to cause short accumulation exposure associated with a short accumulation signal of a preceding frame to correspond to short accumulation exposure associated with a short accumulation signal of a succeeding frame, wherein the preceding frame and the succeeding frame constitute an N-frame sequence; and a processor configured to:

apply histogram examination on a first composite signal to generate a tone conversion curve, wherein the first composite signal is a combination of the short accumulation signal of the preceding frame and a long accumulation signal of the preceding frame;

apply tone conversion on a second composite signal based on the tone conversion curve, wherein the second composite signal is a combination of the short accumulation signal of the succeeding frame and a long accumulation signal of the succeeding frame; and process the succeeding frame based on the second composite signal that has undergone the tone conversion.

* * * * *